(12) United States Patent
Lu et al.

(10) Patent No.: US 11,038,972 B2
(45) Date of Patent: Jun. 15, 2021

(54) SERVICE PROVIDING METHOD, APPARATUS, AND SYSTEM

(71) Applicant: HUAWEI TECHNOLOGIES CO., LTD., Guangdong (CN)

(72) Inventors: Wei Lu, Shenzhen (CN); Shuigen Yang, Shanghai (CN); Wenqi Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/456,027

(22) Filed: Jun. 28, 2019

(65) Prior Publication Data

US 2019/0327317 A1    Oct. 24, 2019

Related U.S. Application Data

(63) Continuation of application No. PCT/CN2017/119384, filed on Dec. 28, 2017.

(30) Foreign Application Priority Data

Dec. 30, 2016    (CN) .......................... 201611265370.3

(51) Int. Cl.
    *H04L 29/08*      (2006.01)
    *H04W 4/70*      (2018.01)

(52) U.S. Cl.
    CPC .............. *H04L 67/20* (2013.01); *H04L 67/10* (2013.01); *H04L 67/26* (2013.01); *H04L 67/32* (2013.01); *H04L 67/148* (2013.01); *H04W 4/70* (2018.02)

(58) Field of Classification Search
    CPC ......... H04L 67/20; H04L 67/10; H04L 67/26; H04L 67/32; H04L 67/148;
(Continued)

(56) References Cited

U.S. PATENT DOCUMENTS 9,195,491 B2 * 11/2015 Zhang ................. H04L 41/0813
9,552,219 B2 * 1/2017 Zhang ................. H04L 61/2517
(Continued)

FOREIGN PATENT DOCUMENTS

CN      102244644 A      11/2011
CN      103650437 A      3/2014
(Continued)

OTHER PUBLICATIONS

Extended European Search Report issued in European Application No. 17889131.3 dated Sep. 23, 2019, 7 pages.
(Continued)

*Primary Examiner* — Ninos Donabed
(74) *Attorney, Agent, or Firm* — Fish & Richardson P.C.

(57) ABSTRACT

A method for providing service is provided. A network slice management system of an operator receives a service request message sent by a control device of a third-party service provider. The service request message is used to request the network slice management system to provide a service, and the service request message carries a service requirement. The network slice management system creates a network slice instance based on the service requirement. The network slice instance is used to provide the requested service. The network slice management system sends a notification message to the control device. The notification message carries an identity of the network slice instance.

19 Claims, 14 Drawing Sheets

(58) Field of Classification Search
CPC ............ H04L 41/0893; H04L 41/0806; H04L 43/0817; H04L 41/0896; H04W 4/70; H04W 24/02; H04W 4/50; H04W 48/18; H04W 24/04; H04W 88/18; H04W 16/02; H04W 36/14

See application file for complete search history.

(56) References Cited

U.S. PATENT DOCUMENTS

| | | | |
|---|---|---|---|
| 9,667,495 B2* | 5/2017 | Van Der Merwe ... | H04W 92/02 |
| 10,708,368 B1* | 7/2020 | Young ................. | H04L 41/5051 |
| 2004/0179526 A1 | 9/2004 | Cypher | |
| 2011/0013635 A1 | 1/2011 | Wan et al. | |
| 2012/0233302 A1* | 9/2012 | Kallin ................. | H04L 41/5025 |
| | | | 709/221 |
| 2013/0125120 A1* | 5/2013 | Zhang ................ | H04L 41/0889 |
| | | | 718/1 |
| 2016/0105893 A1 | 4/2016 | Senarath et al. | |
| 2016/0112301 A1* | 4/2016 | Shimada .............. | H04L 45/586 |
| | | | 370/390 |
| 2016/0352924 A1* | 12/2016 | Senarath ........... | H04M 15/8033 |
| 2016/0353367 A1* | 12/2016 | Vrzic ................ | H04W 72/0433 |
| 2016/0353379 A1* | 12/2016 | Vrzic ................... | H04W 76/28 |
| 2017/0164187 A1* | 6/2017 | Lu .......................... | H04W 8/24 |
| 2017/0303259 A1* | 10/2017 | Lee ....................... | H04W 12/08 |
| 2018/0054237 A1* | 2/2018 | Tseng ................ | H04W 36/0033 |
| 2018/0220276 A1* | 8/2018 | Senarath ............. | H04L 12/1403 |
| 2018/0241635 A1* | 8/2018 | Rao ..................... | H04L 41/0816 |
| 2018/0270666 A1* | 9/2018 | Lee ..................... | H04W 12/069 |
| 2018/0270712 A1* | 9/2018 | Faccin ................. | H04W 72/10 |
| 2018/0288582 A1* | 10/2018 | Buckley ............... | H04W 48/14 |
| 2018/0332485 A1* | 11/2018 | Senarath ............. | G06F 9/45558 |
| 2019/0386878 A1* | 12/2019 | Chou ..................... | H04W 4/50 |

FOREIGN PATENT DOCUMENTS

| | | |
|---|---|---|
| CN | 106060900 A | 10/2016 |
| CN | 106210042 A | 12/2016 |
| CN | 106657194 A | 5/2017 |

OTHER PUBLICATIONS

Office Action issued in Chinese Application No. 201611265370.3 dated May 14, 2020, 16 pages (with English translation).

3GPP TR 22.864 V15.0.0 (Sep. 2106), 3rd Generation Partnership Project; Technical Specification Group Services and System Aspects; Feasibility Study on New Services and Markets Technology Enablers—Network Operation; Stage 1 (Release 15), Technical Report, Sep. 2016, 35 pages.

PCT International Search Report and Written Opinion issued in International Application No. PCT/CN2017/119384 dated Mar. 30, 2018, 17 pages (with English translation).

* cited by examiner

SERVICE PROVIDING METHOD, APPARATUS, AND SYSTEM

CROSS-REFERENCE TO RELATED APPLICATION

This is a continuation of International Application No. PCT/CN2017/119384, filed Dec. 28, 2017, which claims the priority of Chinese Patent Application No. 201611265370.3, filed Dec. 30, 2016. The disclosures of the aforementioned applications are hereby incorporated by reference in their entireties.

TECHNICAL FIELD

This application relates to the communications field, and more specifically, to a service providing method, an apparatus and a system.

BACKGROUND

With rapid development of wireless communications technologies, a 5th generation (5G) wireless communications technology currently has become a hot topic in the industry. 5G supports a variety of application requirements, including: supporting an access capability with higher-rate experience and a larger bandwidth, information exchange with a lower latency and high reliability, access and management of more massive machine type communications devices with low costs, and the like. In addition, 5G supports various vertical industry application scenarios, such as the Internet of Vehicles, emergency communications, and the industrial Internet. Due to these performance requirements and application scenarios of 5G, a 5G network needs to better meet a particular requirement of a user, and a customization capability of the 5G network needs to be further improved.

For this purpose, an important concept, namely, network slicing, is introduced in 5G. A network system includes one or more network slice instances, for example, a critical machine type communication (MTC) network slice instance, a massive MTC network slice instance, and a mobile broadband (MBB) network slice instance. Different network slice instances serve different use cases of communication services.

A third-party service provider (SP for short below) refers to a virtual network operator (VNO), or another company, an organization, or the like that requires a mobile network service. The virtual network operator refers to a partner that owns one or some capabilities (such as a technical capability, an equipment supply capability, and a market capability) and forms a partnership with a telecommunications operator on one or some services. The telecommunications operator delivers, based on a specific benefit allocation proportion, a service to the virtual network operator for development. The virtual network operator obtains some communications networks from the telecommunications operator, and then provides a service for consumers of the virtual network operator by using a charging system, a customer service, and a marketing and management system of the virtual network operator. The another company and the organization that require a mobile network service, for example, an electric power company, need to obtain a mobile communication service from the telecommunications operator to complete intelligent meter reading. A government agency, for example, a public security organ and a fire brigade, needs to obtain a mobile communication service from the telecommunications operator to complete daily work. These SPs respectively have different requirements for the mobile communications network, including security, isolation, a charging mode, mobility, a latency, a quantity of accessed users, reliability, and the like.

However, at present, there is no solution for providing a communication service for the SP by using a network slice.

SUMMARY

Embodiments of the present invention provide a service providing method, an apparatus, and a system, so that an operator provides a service for a third-party service provider in a form of a network slice.

A first aspect provides a service providing method, including: receiving, by a network slice management system of an operator, a service request message sent by a control device of a third-party service provider, where the service request message is used to request the network slice management system to provide a service, and the service request message carries a service requirement; creating, by the network slice management system, a network slice instance based on the service requirement, where the network slice instance is used to provide the requested service; and sending, by the network slice management system, a notification message to the control device, where the notification message carries an identity of the network slice instance.

In this embodiment of the present invention, the third-party service provider is equipped with a control device to interact with the network slice management system of the operator, so that the operator provides a service for the SP in a form of a network slice.

In a possible design, the network slice management system checks whether a network resource and a capability of the operator support the service requirement, and when the network resource and the capability support the service requirement, the network slice management system negotiates service information with the control device.

In a possible design, the service request message further carries a network function of the third-party service provider.

In this embodiment of the present invention, when the third-party service provider provides a self-owned network function, the network slice management system of the operator creates, for the third-party service provider, a network slice instance that includes the self-owned network function of the third-party service provider, so as to provide the third-party service provider with the required service by using the self-owned network function of the third-party service provider.

In a possible design, the service request message further carries a management function of the third-party service provider.

In a possible design, the network slice management system receives performance data and fault data that are of the network function and that are sent by the control device.

In a possible design, the network slice management system receives a service instance creation request sent by the control device, and the network slice management system creates a plurality of service instances on the network slice instance.

In this embodiment of the present invention, when the operator provides the network slice instance for the third-party service provider, the third-party service provider orchestrates the plurality of service instances on the network slice instance, and provides a differentiated service for a user of the third-party service provider. In a possible design, the network slice management system receives information about another network slice instance sent by the control device, and the another network slice instance is created by another operator.

In a possible design, the network slice management system configures the network slice instance and the another network slice instance to support handover of a user of the third-party service provider from the network slice instance to the another network slice instance.

In this embodiment of the present invention, when a plurality of operators provide a plurality of network slice instances for the third-party service provider, the third-party service provider participates in coordinating the network slice instances so that the network slice instances provide a same service for the third-party service provider. The user of the third-party service provider may obtain a same/similar network service from any one of these network slice instances.

In a possible design, the network slice instance is a sub-network slice instance.

In a possible design, the network slice management system receives another sub-network slice instance, and combines the sub-network slice instance and the another sub-network slice instance into a complete network slice instance to provide a service for the third-party service provider.

In this embodiment of the present invention, when a plurality of operators separately provide some network slice instances, namely, sub-network slice instances for the third-party service provider, the third-party service provider integrates and configures all the sub-network slice instances to constitute a complete network slice instance to provide a service for a user of the third-party service provider.

In a possible design, the network slice management system communicates with the control device through an NG-OP-SP interface.

In this embodiment of the present invention, the network slice management system and the control device transmit information in different application scenarios through the NG-OP-SP interface.

A second aspect provides a service providing method, including: sending, by a control device of a third-party service provider, a service request message to a network slice management system of an operator, where the service request message is used to request the network slice management system to provide a service, and the service request message carries a service requirement; and receiving, by the control device, a notification message sent by the network slice management system, where the notification message carries an identity of the network slice instance. In a possible design, the service request message further carries a network function of the third-party service provider.

In a possible design, the service request message further carries a management function of the third-party service provider.

In a possible design, the control device sends performance data and fault data of the network function to the network slice management system.

In a possible design, the control device sends a service instance creation request to the network slice management system, where the service instance creation request is used to request the network slice management system to create a plurality of service instances on the network slice instance.

In a possible design, the control device sends information about another network slice instance to the network slice management system, and the another network slice instance is created by another operator.

In a possible design, the network slice instance and the another network slice instance support handover of a user of the third-party service provider from the network slice instance to the another network slice instance.

In a possible design, the control device decomposes a complete service requirement into a requirement for an access network and a requirement for a core network, where the service requirement is the requirement for an access network or the requirement for a core network.

In a possible design, the network slice instance is a sub-network slice instance.

In a possible design, the control device receives information about another sub-network slice instance, and combines the sub-network slice instance and the another sub-network slice instance into a complete network slice instance.

In a possible design, the control device communicates with the network slice management system through an NG-OP-SP interface.

The second aspect and the possible design manners of the second aspect have beneficial effects corresponding to the first aspect and the possible design manners of the first aspect, and details are not described separately herein again.

A third aspect provides a network device, including a receiving unit, a processing unit, and a sending unit. The receiving unit is configured to receive a service request message sent by a control device of a third-party service provider, where the service request message is used to request the network device to provide a service, and the service request message carries a service requirement. The processing unit is configured to create a network slice instance based on the service requirement, where the network slice instance is used to provide the requested service. The sending unit is configured to send a notification message to the control device, where the notification message carries an identity of the network slice instance.

In a possible design, the service request message further carries a network function of the third-party service provider.

In a possible design, the receiving unit is configured to receive performance data and fault data that are of the network function and that are sent by the control device.

In a possible design, the receiving unit is configured to receive information about another network slice instance sent by the control device, where the another network slice instance is created by another operator.

In a possible design, the processing unit is configured to configure the network slice instance and the another network slice instance to support handover of a user of the third-party service provider from the network slice instance to the another network slice instance.

In a possible design, the network slice instance is a sub-network slice instance, the receiving unit is configured to receive another sub-network slice instance, and the processing unit is configured to combine the sub-network slice instance and the another sub-network slice instance into a complete network slice instance.

In a possible design, the sending unit and the receiving unit communicate with the control device through an NG-OP-SP interface.

The third aspect and the possible design manners of the third aspect have beneficial effects corresponding to the first aspect and the possible design manners of the first aspect, and details are not described separately herein again.

A fourth aspect provides a network device, including a sending unit and a receiving unit. The sending unit is configured to send a service request message to a network slice management system of an operator, where the service request message is used to request the network slice management system to provide a service, and the service request message carries a service requirement. The receiving unit is configured to receive a notification message sent by the network slice management system, where the notification message carries an identity of the network slice instance.

In a possible design, the service request message further carries a network function of the third-party service provider.

In a possible design, the sending unit is configured to send performance data and fault data of the network function to the network slice management system.

In a possible design, the sending unit is configured to send a service instance creation request to the network slice management system, where the service instance creation request is used to request the network slice management system to create a plurality of service instances on the network slice instance.

In a possible design, the sending unit is configured to send information about another network slice instance to the network slice management system, and the another network slice instance is created by another operator.

In a possible design, the network slice instance and the another network slice instance support handover of a user of the third-party service provider from the network slice instance to the another network slice instance.

In a possible design, the network device further includes a processing unit, configured to decompose a complete service requirement into a requirement for an access network and a requirement for a core network, where the service requirement is the requirement for an access network or the requirement for a core network.

In a possible design, the network slice instance is a sub-network slice instance, the receiving unit is configured to receive information about another sub-network slice instance, and the processing unit is configured to combine the sub-network slice instance and the another sub-network slice instance into a complete network slice instance.

In a possible design, the sending unit and the receiving unit communicate with the network slice management system through an NG-OP-SP interface.

The fourth aspect and the possible design manners of the fourth aspect have beneficial effects corresponding to the first aspect and the possible design manners of the first aspect, and details are not described separately herein again.

A fifth aspect provides a network device, including a memory, a processor, and a transceiver. The transceiver, the memory, and the processor may be connected by using a bus system. The memory is configured to store a program instruction, and the processor is configured to execute the program instruction stored in the memory, to control the transceiver to receive a signal and/or send a signal. The transceiver may be corresponding to the sending unit and the receiving unit in the third aspect or various possible designs of the third aspect, and is configured to perform functions of the sending unit and the receiving unit. The processor may be corresponding to the processing unit in the third aspect or various possible designs of the third aspect, and is configured to perform a function of the processing unit.

A sixth aspect provides a network device, including a memory, a processor, and a transceiver. The transceiver, the memory, and the processor may be connected by using a bus system. The memory is configured to store a program instruction, and the processor is configured to execute the program instruction stored in the memory, to control the transceiver to receive a signal and/or send a signal. The transceiver may be corresponding to the sending unit and the receiving unit in the fourth aspect or various possible designs of the fourth aspect, and is configured to perform functions of the sending unit and the receiving unit. The processor may be corresponding to the processing unit in various designs of the third aspect, and is configured to perform a function of the processing unit.

A seventh aspect provides a computer readable storage medium, where the computer readable storage medium stores an instruction, and when the computer readable storage medium runs on a computer, the computer performs the methods in the first aspect and various possible designs of the first aspect.

An eighth aspect provides a computer readable storage medium, where the computer readable storage medium stores an instruction, and when the computer readable storage medium runs on a computer, the computer performs the methods in the second aspect and various possible designs of the second aspect.

A ninth aspect provides a computer program product that includes an instruction, where when the computer program product runs on a computer, the computer performs the methods in the first aspect and various possible designs of the first aspect.

A tenth aspect provides a computer program product that includes an instruction, where when the computer program product runs on a computer, the computer performs the methods in the second aspect and various possible designs of the second aspect.

An eleventh aspect provides a communications system, including the controller and the network slice management system in the first or second aspect. Alternatively, the communications system includes the network device in the third or fourth aspect.

The fifth aspect to the eleventh aspect and the possible design manners of the fifth aspect to the eleventh aspect have beneficial effects corresponding to the first aspect and the possible design manners of the first aspect, and details are not described separately herein again.

DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

Figure 1:
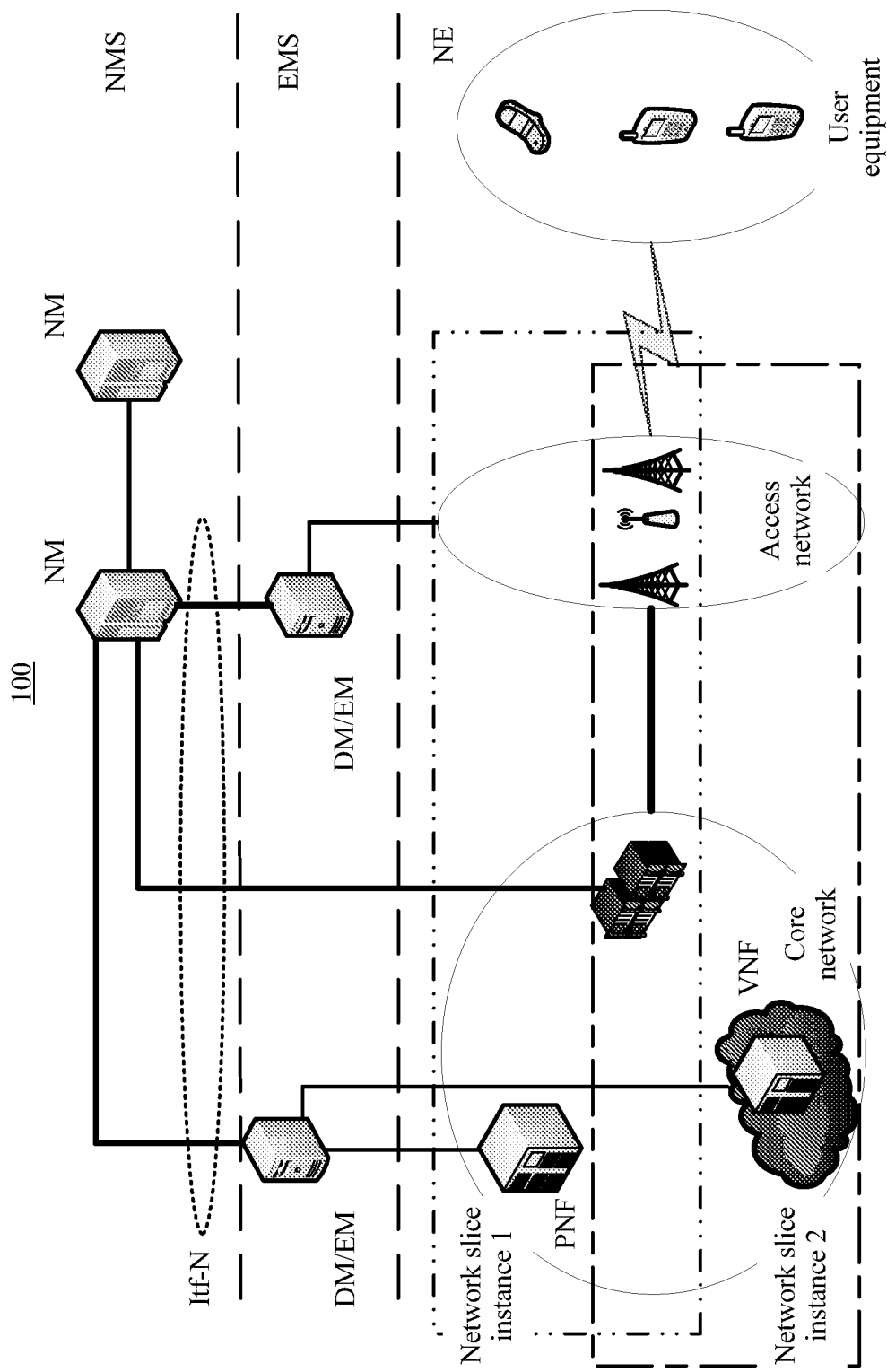
FIG. 1 is a schematic diagram of a network management architecture according to an embodiment of the present invention.

The technical solutions in the embodiments of the present invention are further described below in detail by using the accompanying drawings and the embodiments.

DESCRIPTION OF EMBODIMENTS

The following describes the technical solutions in the embodiments of the present invention with reference to the accompanying drawings in the embodiments of the present invention.

The embodiments of the present invention relate to a network slicing technology. The network slicing technology logically abstracts a network as one or more mutually isolated network slices, and each network slice includes a series of logical network functions, to pertinently meet differentiated requirements of different service types. For example, in a 5th generation mobile communications (5G) network, network slicing is an on-demand networking manner, and brings, to an operator, a new service that can be adjusted based on an ever-changing user requirement and that can rapidly meet a new application requirement.

The network slicing technology abstracts, based on a scenario requirement, a physical infrastructure resource in the 5G network as a plurality of parallel network slice instances that are independent of each other. In each network slice instance, based on a requirement of a service scenario and a service model, a network function is customized and tailored, and a corresponding network function is orchestrated and managed. One network slice instance may be considered as one instantiated 5G network. In such a network structure, it allows the operator to provide a network for a user as a service, and can freely combine physical networks based on indicators such as a rate, a capacity, coverage, a latency, reliability, security, and availability, to meet requirements of different users.

For ease of understanding, some terms in this specification are described first.

A network slice means that different logical networks are customized based on different service requirements on a physical or virtual network infrastructure. The network slice may be a complete end-to-end network that includes a terminal, an access network, a transport network, a core network and an application server, can provide a telecommunication service, and has a specific network capability. The network slice may also be any combination of the terminal, the access network, the transport network, the core network, and the application server that are described above. For example, the network slice includes only the access network and the core network. The network slice may have one or more of the following features: the access network may be sliced, or may be not sliced; the access network may be shared by a plurality of network slices; features and network functions supported by the network slices may be different, and are optimized based on an application scenario; and a plurality of network slice instances may be deployed in a network to provide a same feature and optimization, but to provide services for different users.

A network slice instance (NSI) is a really running logical network, and can meet a specific network feature or service requirement. One network slice instance may provide one or more services. The network slice instance may be created by a network management system. One network management system may create and manage a plurality of network slice instances. The management includes performance monitoring, fault management, and the like in a process of running the network slice instances. When a plurality of network slice instances coexist, some network resources and network functions may be shared between the network slice instances. The network slice instance may be created from a network slice template, or may not be created from a network slice template.

A complete network slice instance can provide a complete end-to-end network service, and a network slice instance may include a sub-network slice instance and/or a network function. The sub-network slice instance may not need to provide a complete end-to-end network device. The sub-network slice instance may be a set of network functions of a same equipment vendor in the network slice instance, or may be a set of network functions divided based on domains, for example, a sub-network slice instance of a core network and a sub-network slice instance of an access network. The sub-network slice instance may be shared by a plurality of network slice instances. Proposing a sub-network slice instance may help the network management system perform management. One network slice instance may include several sub-network slice instances, and each sub-network slice instance includes several network functions. One network slice instance may include several sub-network slice instances and network functions that are not divided into sub-network slice instances. One network slice instance may include only several network functions. The network function may include a physical network function and/or a virtualized network function. The physical network function and/or the virtualized network function are/is collectively referred to as the network function below.

Optionally, one network slice instance may provide a plurality of services at the same time. For example, an operator uses one network slice instance to provide a water affairs company with a water meter reading service, and to provide an electric power company with an electricity meter reading service. Management data of different services, including performance data, fault information, and the like, may be isolated when required. When one network slice instance provides a plurality of services, a network management system may allocate one identity to each service instance, and enable a network function and/or a sub-network slice instance of the network slice instance to perceive each service instance.

A network slice template is a manner of generating the network slice instance, and is used to provide a reference for generating the network slice instance. The network slice template specifies how the network slice instance should be generated. For example, the network slice template may indicate specific network functions included in a network slice, key performance indicators (KPI) that need to be achieved, and the like.

A network function is a processing function in a network, and defines a functional behavior and a functional interface. The network function may be implemented by using dedicated hardware, or may be implemented by running software on dedicated hardware, or may be implemented in a form of a virtual function on a general-purpose hardware platform.

Therefore, from a perspective of implementation, the network function may be divided into a physical network function and a virtualized network function. However, from a perspective of use, the network function may be divided into a dedicated network function and a shared network function. Specifically, a plurality of network slice instances may independently use different network functions, which are referred to as dedicated network functions, or may share a same network function, which is referred to as a shared network function.

To provide a service for an SP by using a network slice, the network management system first needs to support management and orchestration of the network slice. FIG. 1 shows a network management architecture 100. The network management architecture 100 includes three layers: a network management system (NMS), an element management system (EMS), and a network element (NE). There is an interface between the EMS and the NE, and the EMS and the NE can communicate with each other. There is an interface between the EMS and the NMS, and the EMS and the NMS can communicate with each other. The interface between the EMS and the NMS may be an Itf-N interface. Certainly, the interface may have another name.

The NMS mainly provides a network management function, and may include one or more network managers. The NMS may manage networks of different equipment suppliers in different geographic areas. A network administrator may perform overall monitoring on the network by using the NMS. The NMS may provide a plurality of basic functions of network management, for example, fault management, configuration management, accounting management, performance management, and security management.

Figure 2:
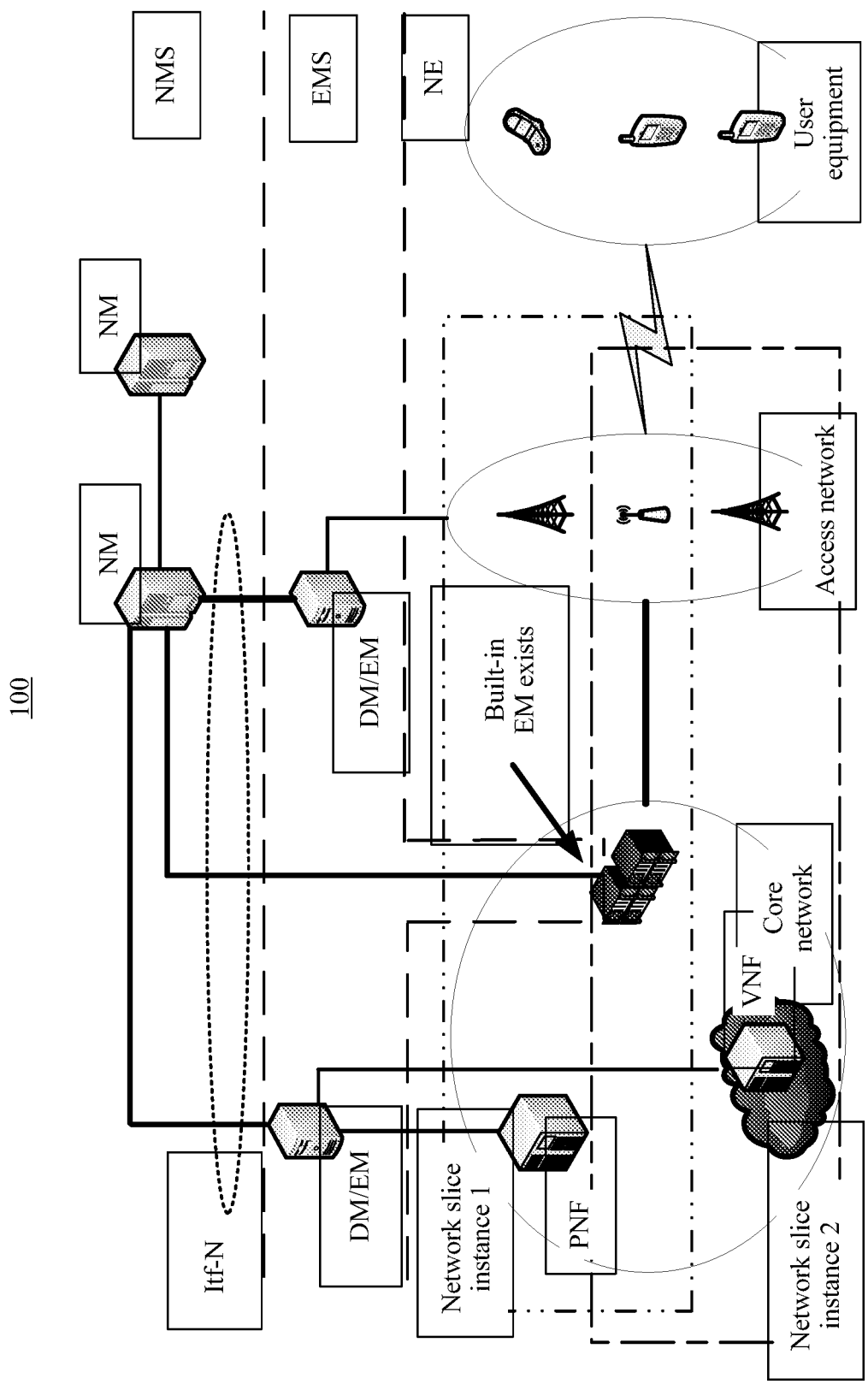
FIG. 2 is a schematic diagram of another network management architecture according to an embodiment of the present invention.

The EMS may include an element manager (EM) and/or a domain manager (DM). The EM is a network module used to manage a network element. The EM may be disposed on the network element, or may be disposed separately. The DM is a management system module whose management scope is one level larger than that of the EM. The DM may manage one or more EMs. For example, the DM may be a management system of a vendor. It should be noted that, the EM and the DM are different in definition. The EM directly manages network devices of a same type. For example, the EM manages a series of base stations. The DM manages a network device that belongs to a vendor, and provides a domain management function. The DM has a larger management scope than the EM. Generally, an EM device is used to configure a network function. However, in the embodiments of the present invention, a possibility that the DM performs the procedure of the EM is not excluded. The EM may be disposed separately, as shown in FIG. 1. The EM may also be disposed on an NE, as shown in FIG. 2.

The NE may be a physical network function (PNF) module and/or a virtualized network function (VNF) module. The PNF module is a physical device that provides a fixed network function. For example, the PNF module may be a network element (NE) in a conventional 3GPP network management architecture, namely, a physical network element. The NE may be an access network device or a core network device. For example, the NE may be a base station, a mobility management entity (MME), a serving gateway (SGW), or the like. The VNF module may be a minimum virtual unit that can be monitored and managed in the network management architecture.

A network slice instance may include an NE. The network slice instance is created by the NMS, and one NMS may create or manage one or more network slice instances. One network slice instance may include several sub-network slice instances, and each sub-network slice instance includes several network functions. One network slice instance may include several sub-network slice instances and network functions that are not divided into sub-network slice instances. One network slice instance may include only several network functions. A radio access network may be sliced or may be not sliced. In FIG. 1, the radio access network is not sliced, and a network slice instance 1 and a network slice instance 2 share the radio access network. In FIG. 2, the radio access network is sliced, and a network slice instance 1 and a network slice instance 2 respectively include slice instances of different parts of the radio access network, or share slice instances of a same part of the radio access network.

Figure 3:
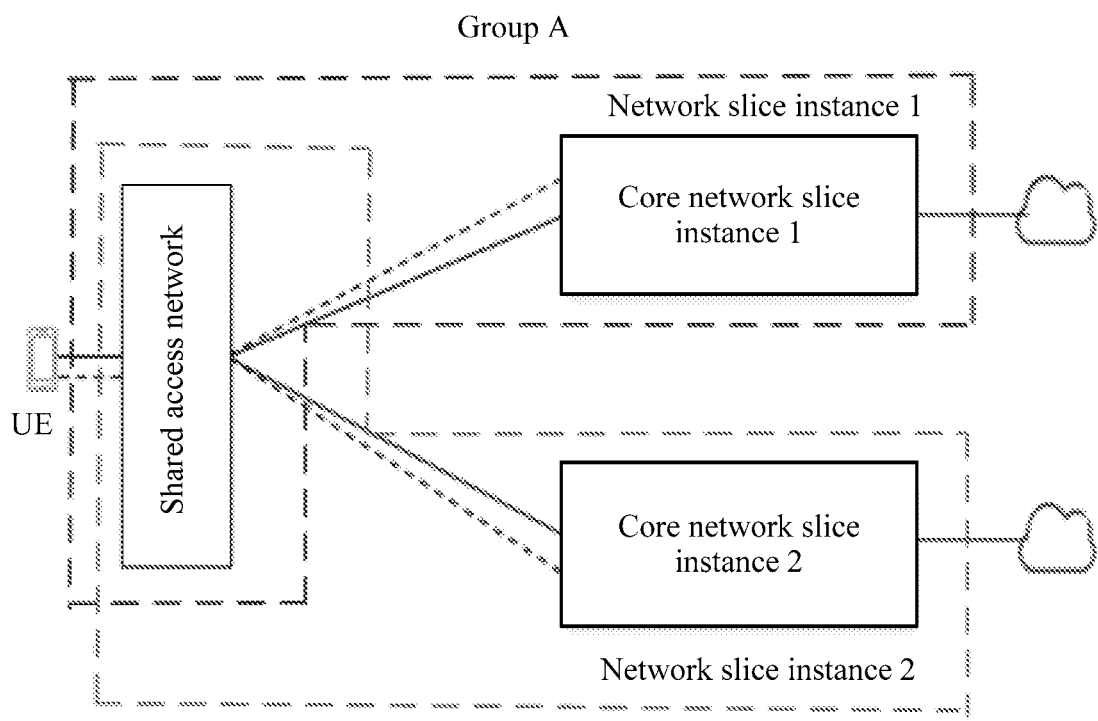
FIG. 3 is a schematic diagram of a network slice instance according to an embodiment of the present invention.
Figure 4:
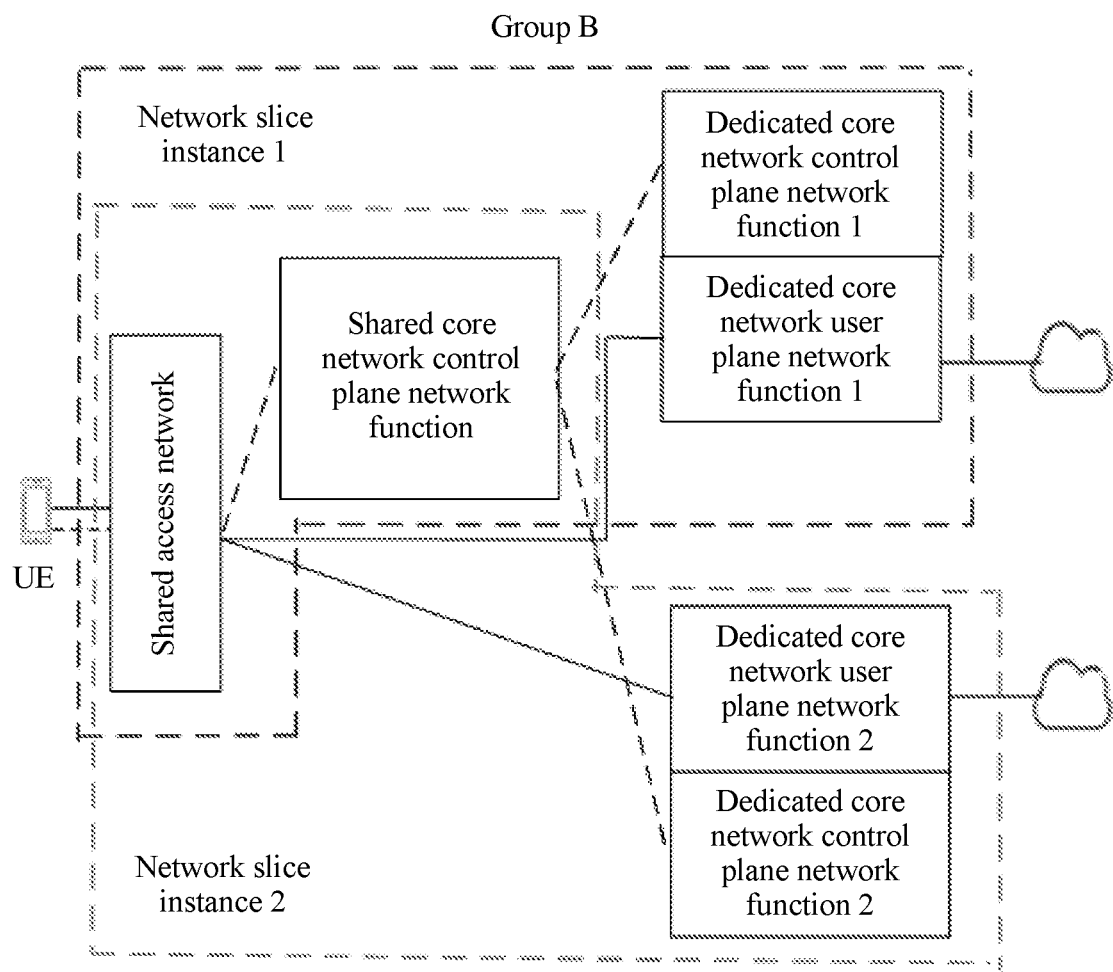
FIG. 4 is a schematic diagram of another network slice instance according to an embodiment of the present invention.

When a plurality of network slice instances coexist, the network slice instances may be completely isolated from each other, or may share some network resources and functions. The plurality of network slice instances may coexist in the following two scenarios: a group A and a group B, as shown in FIG. 3 and FIG. 4 respectively. In FIG. 3, a network slice instance 1 and a network slice instance 2 share a radio access network (RAN). The network slice instance 1 includes the radio access network and a core network slice instance 1 (which may also be referred to as a sub-network slice instance 1 of the core network). The network slice instance 2 includes the radio access network and a core network slice instance 2 (which may also be referred to as a sub-network slice instance 2 of the core network). The core network slice instance 1 and the core network slice instance 2 are completely isolated logically.

FIG. 4 shows a schematic structural block diagram of a network slice instance according to another embodiment of the present invention. In FIG. 4, there are some shared control plane functions between a network slice instance 1 and a network slice instance 2, and the shared control plane functions are referred to as shared core network control plane network functions (Common Control Plane Network Function, common CP NF). Each network slice instance further has a dedicated core network control plane network function (Common Control Plane Network Function, slice-specific CP NF) and a dedicated core network user plane network function (Slice-specific User Plane Network Function, slice-specific UP NF). The network slice instance 1 includes the radio access network, the shared core network control plane network function, a dedicated core network control plane network function 1, and a dedicated core network user plane network function 1. The network slice instance 2 includes the radio access network, the shared core network control plane network function, a dedicated core network control plane network function 2, and a dedicated core network user plane network function 2. It should be noted that, the radio access network may also be sliced. The radio access network may include network slice instances of the access network that are completely isolated logically, or there may be some shared network functions between the network slice instances of the radio access network. In addition, when the radio access network includes the network slice instances of the access network that are completely isolated logically, the core network may include core network slice instances that are completely isolated logically or the core network slice instances may have some shared network functions. When there are some shared network functions between the network slice instances of the radio access network, the core network may include the core network slice instances that are completely isolated logically or the core network slice instances may have some shared network functions.

In the network management architecture 100, the NMS includes a network slice manager and orchestrator (NSM&O). The NSM&O may be disposed on an NM, or may be disposed separately.

Figure 5:
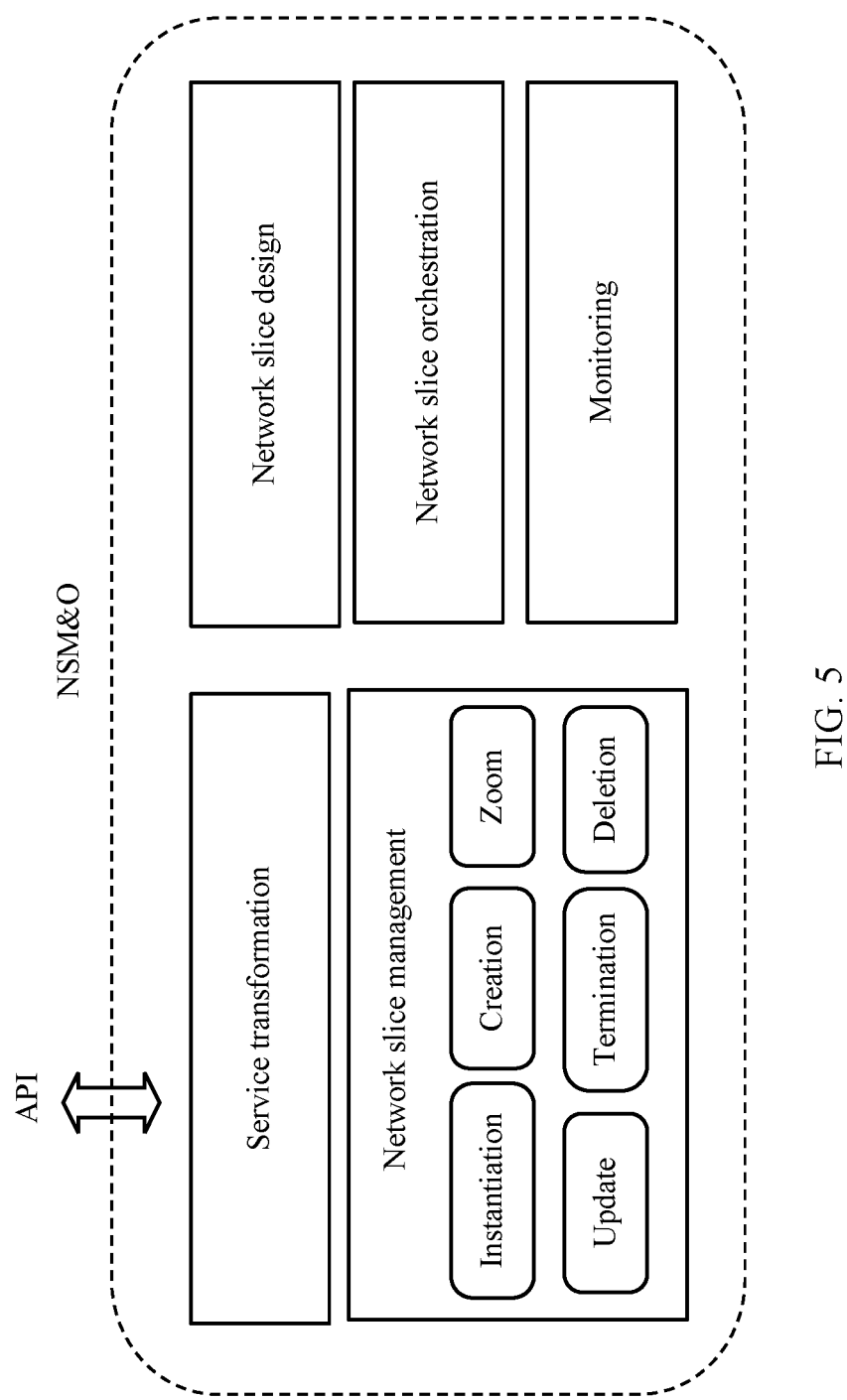
FIG. 5 is a hierarchical chart of an NSM&O according to an embodiment of the present invention.

As shown in FIG. 5, the NSM&O mainly includes the following functional modules: a service transformation module, a network slice design module, a network slice policy management module, a network slice orchestration module, and a monitoring module.

Specifically, the service transformation module is configured to: receive, through an application programming interface (API), a service description sent by a transmit end device Sender, and transform the service description into a requirement for the network.

When the SP needs to obtain a complete network slice instance from the operator, the service description sent by the SP may include a required service type (for example, an eMBB service, a URLLC service, and an MTC service), a time range and a geographic range that require a network service, an independence requirement, a security requirement, a network performance requirement (for example, a QoS indicator, a quantity of concurrently accessed users, and a throughput rate), another Service Level Agreement (SLA) indicator, and the like. When the SP needs to obtain some network slice instances, namely, sub-network slice instances from the operator, the service description sent by the SP may include a required sub-network slice instance type (for example, an access network sub-network slice and a core network sub-network slice), a time range and a geographic range that require a network service, an independence requirement, a security requirement, a network performance requirement (for example, a QoS indicator, a quantity of concurrently accessed users, and a throughput rate), another SLA indicator, and the like.

A requirement of the network may be as follows: which network functions/sub-network slice instances are required in the network; how performance of these network functions/sub-network slice instances is; how many computing, storage, and network resources are required; what a logical topology of these network functions/sub-network slice instances is; whether to use a shared network function/sub-network or a dedicated network function/sub-network, and so on. Transformation is mapping performed according to a pre-designed principle. For example, a service requirement is an MTC service, which corresponds to several required network functions, an access quantity of the MTC, a required resource corresponding to a performance indicator, and the like.

A network slice design module is configured to: based on a result of the service transformation, design a network slice template NSLD, and describe composition of the network slice.

A network slice policy management module is configured to: on-board (on-boarding), instantiate (instantiation), contract and scale (scaling), update (update), terminate (termination), and delete (deletion) a network slice, and other aspects.

A network slice orchestration module is configured to: specifically determine a network function (NF), a resource, and the like that are included in a network slice instance.

A monitoring module is configured to: monitor and report a key performance indicator (KPI) parameter of a network slice instance, and the like.

The foregoing transmit end device may be an application related to an operator, an SP, and a communication service, or any other physical device that may send a request to the NSM&O.

In addition, to ensure that an operator provides a service for an SP by using a network slice, the SP is equipped with a network device, for example, an SP network controller (SPNC), which is configured to directly or indirectly interact with the NSM&O of the operator, so as to provide the service for the SP by using the network slice. The SPNC may be a standalone device, or the SP may abstract the SPNC into a logical function and integrate the logical function into a network device. The SPNC transfers a command parameter to and exchanges data with the NSM&O through an NG-OP-SP interface. It is not limited in this embodiment of the present invention that the NG-OP-SP interface needs a direct communication connection between the NSM&O and the SPNC. For example, the NSM&O may report slice management data to the operator's operation and service management platform, and then the platform transfers the management data to the SPNC through an API. In this embodiment of the present invention, although an interface between the NSM&O and the SPNC is named NG-OP-SP, the interface may also have another name based on a requirement.

In this embodiment of the present invention, the SPNC is an entity used by the SP to participate in network slice instance control, orchestration, management, and service orchestration, management, and control on a network slice instance, and mainly includes the following functions:

1. Raise a service requirement, report an SP's requirement for a mobile network service to one or more operators, and negotiate the SLA.

2. Manage an SP-owned network device, including life cycle management, performance management, fault management, and the like, and open a part or all of management data of the SP-owned network device to the NSM&O of the operator.

3. Subscribe to management data of a network slice instance from the NSM&O of the operator, including performance data, fault information, and the like.

4. When the SP wants to run a plurality of service instances on one network slice instance, orchestrate network functions and resources used by all service instances.

5. When the SP obtains a plurality of network slice instances from a plurality of operators, but the network slice instances provide a same service, coordinate all the network slice instances.

6. When the SP obtains a plurality of sub-network slice instances from the plurality of operators, the SPNC orchestrates and manages the sub-network slice instances, so as to constitute a complete network slice instance to provide a service for the SP.

With reference to FIG. 1 to FIG. 5, the foregoing describes the network management architecture according to this embodiment of the present invention. With reference to the accompanying drawings, the following describes a service providing method according to an embodiment of the present invention. The method in this embodiment of the present invention may be applied to the network management architecture shown in FIG. 1 and FIG. 2, or may be applied to another similar network management architecture. This is not limited in this embodiment of the present invention. In the following embodiment, a device of an operator is a network slice management system, and a device of an SP is a control device. The network slice management system and the control device interact with each other to implement the method in this embodiment of the present invention. For example, the network slice management system may be an NSM&O, and the control device may be an SPNC.

Figure 6:
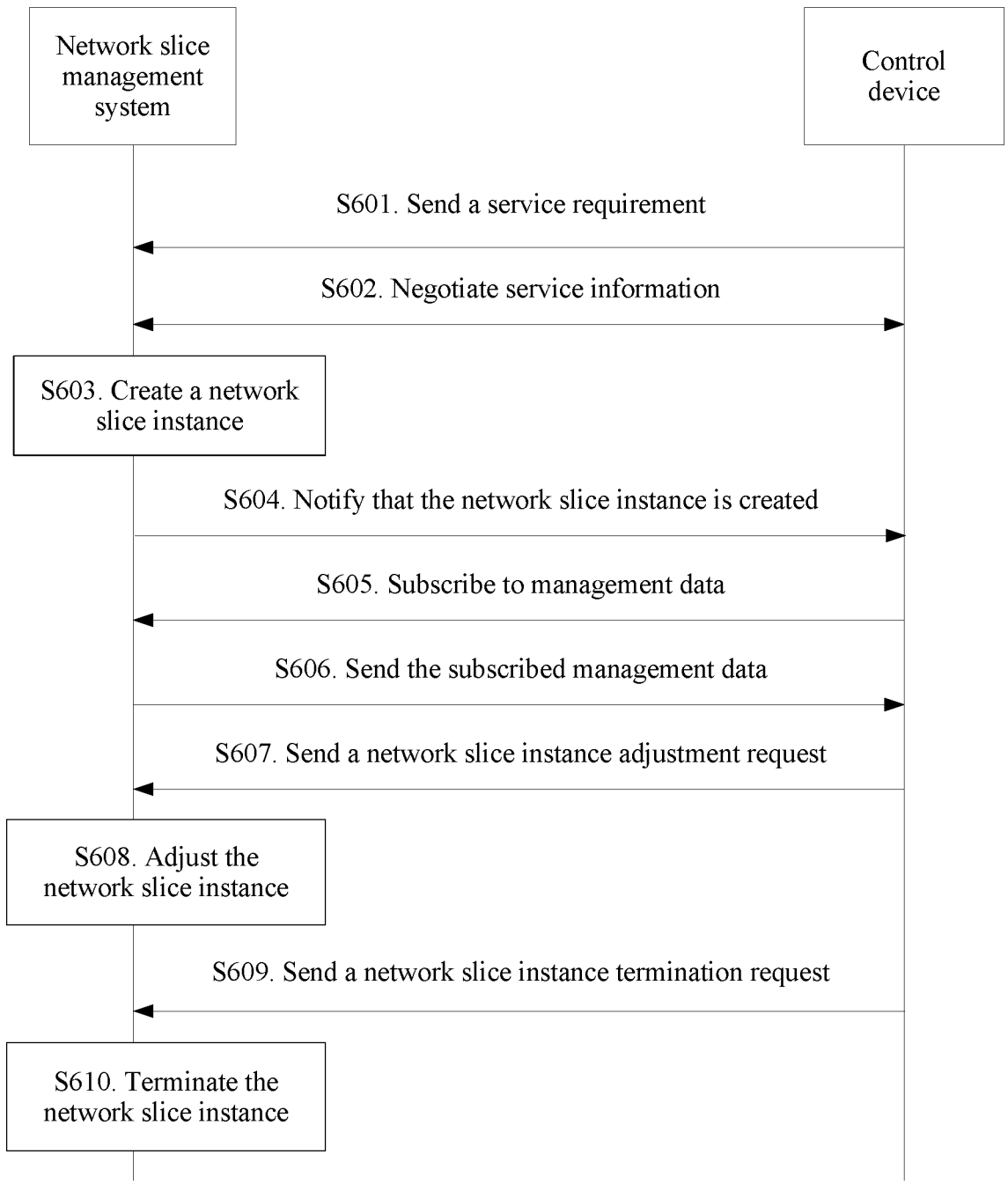
FIG. 6 is a flowchart of a service providing method according to an embodiment of the present invention.

FIG. 6 is a flowchart of a service providing method according to an embodiment of the present invention. The method includes the following steps:

601. An SP raises a service requirement to an operator to request a network service.

In this step, the SPNC may send a service request message to the NSM&O to request the operator to provide the network service. The SP requests the network service from the operator based on operator's network deployment, charging, and/or management etc. The service request message may carry parameters such as a service type and a service requirement that need to be provided. The service requirement includes, for example, one or more of a coverage range, an access quantity, a latency, reliability, and an access rate. The service request message may further carry a required network function.

602. The operator checks a network resource and a capability, and negotiates service information with the SP.

In step 602, the service information may be negotiated through interaction between the NSM&O and the SPNC. The service information includes an SLA, and may further include service information such as a tariff.

603. The operator orchestrates and creates a network slice instance based on the service requirement of the SP to provide a service for the SP.

604. The operator notifies the SP that the network slice instance is created.

In this step, the NSM&O sends a notification message to the SPNC through the NG-OP-SP interface, to notify the SPNC that the network slice instance is created. The notification message carries an identity of the network slice instance. Further, the notification message may further include at least one of a network function and a network resource.

By using the foregoing steps, the operator may provide the SP with the required service by using the created network slice instance. The method in this embodiment of the present invention may further include some or all of the following steps:

605. The SP subscribes to management data of the network slice instance from the operator.

In this step, the SPNC sends a subscription request to the NSM&O through the NG-OP-SP interface, and subscribes to the management data. The management data may include performance data and fault information of the network slice instance.

606. The operator sends the subscribed management data to the SP. Based on subscription of the SPNC to the management data, the NSM&O sends the management data of the network slice instance through the NG-OP-SP interface.

607. The SP sends a network slice instance adjustment request to the operator. When the SP finds that the performance of the current network slice instance does not meet a user's requirement of the SP or the performance is surplus, the SPNC sends the network slice instance adjustment request to the NSM&O through the NG-OP-SP interface.

608. The operator adjusts the network slice instance based on the received network slice instance adjustment request. The NSM&O determines whether the received network slice instance adjustment request complies with a negotiated SLA (such as the SLA in step 602). If the received network slice instance adjustment request does not comply with the negotiated SLA, information such as a new SLA is renegotiated. If the received network slice instance adjustment request complies with the negotiated SLA, the SP's requirement for a service is transformed into a requirement for a network, and the network slice instance is adjusted. Adjustment operations that can be performed include: extending, contracting, and updating the network slice instance, adding a network function to or deleting a network function from the network slice instance, and the like.

609. When the SP no longer needs the network service, the SP sends a network slice instance termination request to the operator. The SPNC sends the network slice instance termination request to the NSM&O through the NG-OP-SP interface, and the network slice instance termination request includes an identity of the network slice instance.

610. The operator terminates the network slice instance, and the NSM&O performs a procedure for terminating the network slice instance.

In this embodiment of the present invention, the SP is equipped with the SPNC controller to directly or indirectly interact with the NSM&O of the operator through the NG-OP-SP interface, so that the operator provides a service for the SP in a form of a network slice.

In the foregoing embodiment, a service is provided for the SP in a form of a network slice instance. In actual application, there are a plurality of different application scenarios. Examples are as follows:

1. The SP has its own network device, and wants to use the network device to provide a service in the network slice instance (for example, the SP is a public security system, and needs to use its own encryption and authentication device). In this case, impact of the SP network device needs to be considered during adjustment of a life cycle of the network slice instance.

2. When the SP wants the network slice instance that serves the SP to provide differentiated services for the SP (for example, a vehicle company provides different levels of services for its vehicles of different brands and models, or a company needs to isolate a confidential service from a non-confidential service), a telecommunications operator needs to provide different services for the same SP on one network slice instance, and management data of different services needs to be independent.

3. When the SP wants to obtain different network slice instances from different telecommunications operators, and these different network slice instances provide a same service for the SP, the SP needs to assist the different network slice instances in interacting with each other to meet a requirement for providing the same service.

4. When the SP wants to obtain sub-network slice instances from different telecommunications operators, and combine these sub-network slice instances into one complete network slice instance to provide a service, the SP needs to complete combination and management of the sub-network slice instances.

With reference to different application scenarios and the method in FIG. 6, the following describes in detail that a service is provided for the SP in a form of a network slice instance in different scenarios.

Figure 7A:
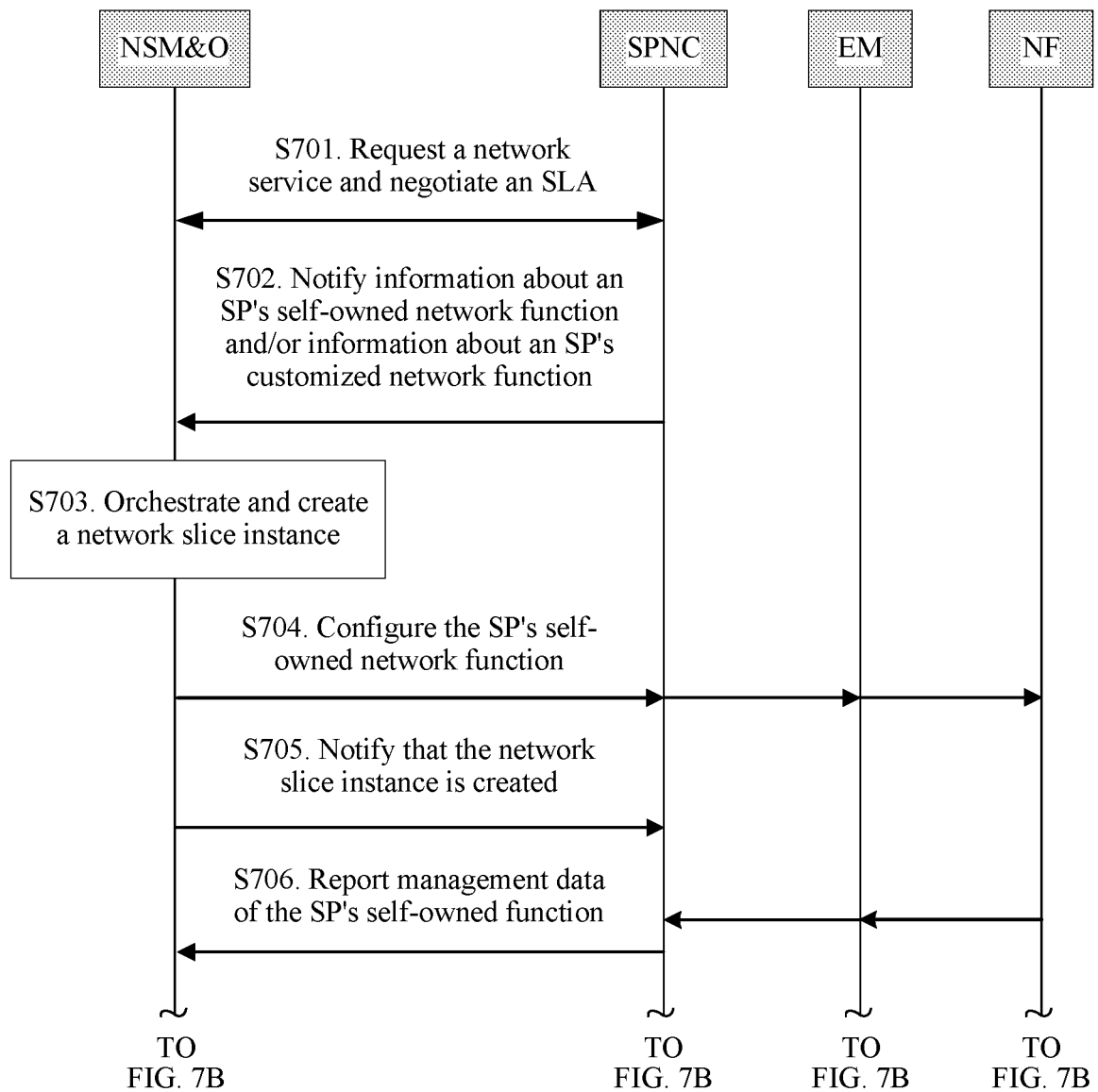
FIG. 7A and FIG. 7B are a flowchart of another service providing method according to an embodiment of the present invention.
Figure 7B:
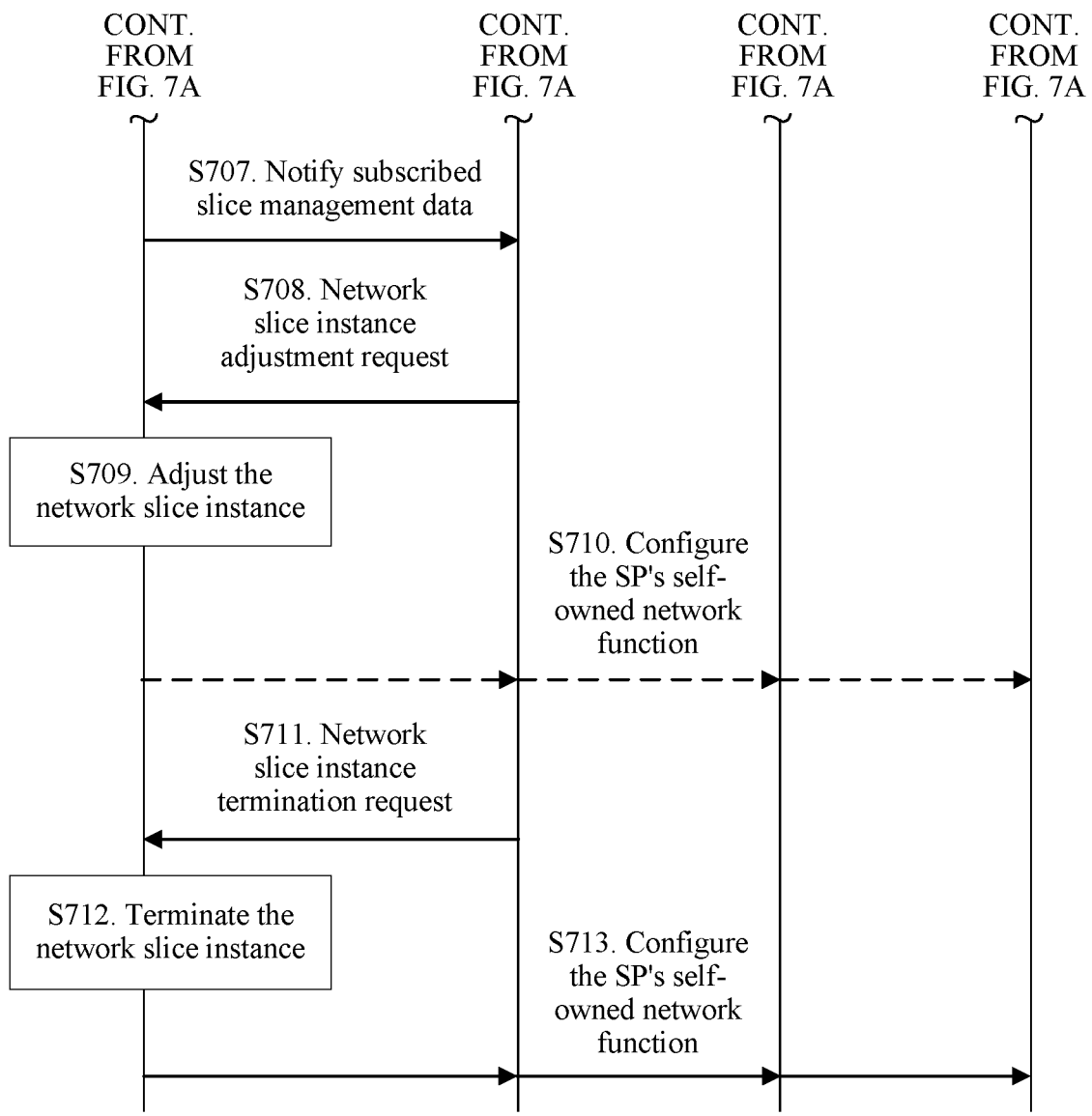

FIG. 7A and FIG. 7B are a flowchart of another service providing method according to an embodiment of the present invention. The method is corresponding to the foregoing scenario 1. Although a network slice instance may provide a wide range of network service for a customer (for example, an SP), in some cases, a capability and a feature of the network slice instance cannot meet a special need of the customer. In some other cases, based on security and commercial considerations, customers need to use their own network functions (for example, the customers' own network devices). Therefore, the customer wants to use a specific network function and/or a specific management function in the network slice instance. In this case, the customer notifies the operator of the network function and/or the management function of the customer. When orchestrating the network slice instance, the operator considers the network function and/or the management function of the customer, and creates the network slice instance to provide the customer with a required service. The network function of the customer is configured to be associated with the network slice instance. In this embodiment of the present invention, the network function may include a self-owned network function or a customized network function. The method in this embodiment of the present invention includes the following steps:

701. A precondition in this embodiment of the present invention is that an SP requests a network service from an operator, and sends parameters such as a required service type and a service requirement. The operator negotiates an SLA and service information such as a tariff with the SP based on a network resource and a capability, and determines to provide a network slice service for the SP. This step is similar to step 601 and step 602.

702. When a network service requirement raised by the SP includes an SP's self-owned network function and/an SP's customized network function, an SPNC sends a service request message to an NSM&O through an NG-OP-SP interface. The service request message carries information such as a function description, an address, and/or a running parameter of the SP's self-owned network function (for the customized network function, parameters such as a function description, a running parameter, and/or a performance indicator of the customized network function are carried).

The SP's self-owned network function may be, for example, the SP's own user authentication function and the SP's own encryption function. The function description may be a function performed by the SP's self-owned network function, for example, an access authentication function, a session management function, some functions of a data plane, and/or a charging function. For example, the address may be an IP address and a port of the self-owned network function. With the function description and the address, the SP's self-owned network function can be orchestrated into a logical topology of the network slice instance. Performance information of the SP's self-owned network function refers to a processing capability of the function. For example, for an access authentication function, the performance information indicates a maximum quantity of concurrently processed users; for a routing function, the performance information indicates a forwarding rate and a bandwidth.

The performance indicator may be a QoS indicator of the SP's self-owned network function, and the QoS indicator may be a latency, a jitter, and/or a packet loss rate.

703. The operator orchestrates and creates a network slice instance based on the service requirement of the SP to provide a service for the SP. If there is the SP's self-owned network function, when orchestrating and creating the network slice instance, and orchestrating a network topology structure, the NSM&O needs to consider an address and a communication link, and the like of the SP's self-owned network device. When the SP proposes the customized network function, based on the network function description provided by the SP, the NSM&O instantiates a new network function based on the function description provided by the SP when creating the network slice instance. The SP's self-owned network function and the SP's customized network function are dedicated network functions of the network slice instance.

704. When the SP provides the self-owned network function, the NSM&O cannot directly manage the SP's self-owned network function. To enable the SP's self-owned network function to work normally in the network slice instance, the NSM&O sends a configuration request to the SPNC through the NG-OP-SP interface. The configuration request may include one or more of the following: a communication link, a communications protocol configuration, an application running parameter configuration, a fault alarm configuration, a performance measurement configuration, other configurations (such as a network slice instance identifier), and the like that are of the SP's self-owned network function and a network function in another network slice instance. After receiving the configuration request, the SPNC configures the self-owned network function by using a management device such as an EM that manages the self-owned network function.

705. The operator notifies the SP that the network slice instance is created. The NSM&O sends a notification message to the SPNC through the NG-OP-SP interface, where the notification message includes an identity of the network slice instance, and may further include at least one of a network function, a network resource, and a related configuration. In this way, the SP provides a network service for a user of the SP.

After the network slice instance is created, the NSM&O may subscribe to management data such as fault information and performance data of the SP's self-owned network function from the SP through the NG-OP-SP interface.

706. The SP reports management data of the SP's self-owned network function. To obtain information such as performance and a fault of the complete network slice instance, the NSM&O needs to know related information such as performance and a fault of the SP self-owned network function. After receiving the management data such as the performance and the fault of the reported SP's self-owned network function (for example, the SP's self-owned network function is reported to an EM served by the SPNC, and then the EM reports the SP's self-owned network function to the SPNC), the SPNC reports the management data of the SP's self-owned function to the NSM&O through the NG-OP-SP interface based on a requirement. In this embodiment of the present invention, the management data such as the performance and the fault may be monitored and collected by a management function.

707. The operator sends the subscribed management data to the SP. If the SP subscribes to the management data of the network slice instance, the NSM&O sends the subscribed management data to the SP through the NG-OP-SP interface after obtaining the information such as the performance and the fault of the complete network slice instance.

708. The SP sends a network slice instance adjustment request to the operator. When the SP finds that the performance of the current network slice instance cannot meet a user's requirement of the SP or the performance is surplus, the SPNC sends the network slice instance adjustment request to the NSM&O through the NG-OP-SP interface. The request carries an identifier of the network slice instance and/or a specific requirement for extending or contracting the network slice instance, for example, shortening a latency, increasing a quantity of concurrently accommodated users, and expanding a coverage range of the slice instance.

709. The operator adjusts the network slice instance based on the received network slice instance adjustment request. The NSM&O determines whether the received network slice instance adjustment request complies with a negotiated SLA (such as the SLA in step 701). If the received network slice instance adjustment request does not comply with the negotiated SLA, information such as a new SLA is renegotiated (which may further include, for example, negotiating a tariff, a time for providing a service, and a geographical range). If the received network slice instance adjustment request complies with the negotiated SLA, the SP's requirement for the service is transformed into a requirement for a network, and the network slice instance is adjusted. Adjustment operations that can be performed include: extending, contracting, and updating the network slice instance, adding a network function to or deleting a network function from the network slice instance, and the like.

710. The operator configures the SP's self-owned network function. If the adjustment of the network slice instance relates to the SP's self-owned network function, for example, a network function having a communication link to the SP's self-owned network function is adjusted, or the SP adjusts the SP's self-owned network function, the SP's self-owned network function needs to be reconfigured. In this step, the NSM&O sends a request for configuring the SP's self-owned network function to the SPNC through the NG-OP-SP interface. After receiving the request for configuring the SP's self-owned network function, the SPNC configures the self-owned network function by using a management device such as an EM that manages the self-owned network function.

711. When the SP no longer needs the network service, the SP sends a network slice instance termination request to the operator. The SPNC sends the network slice instance termination request to the NSM&O through the NG-OP-SP interface, and the network slice instance termination request includes an identity of the network slice instance.

712. The operator terminates the network slice instance, and the NSM&O performs a procedure for terminating the network slice instance.

713. In a process of terminating the network slice instance, the NSM&O has no permission to terminate the SP's self-owned network function. The NSM&O sends a configuration request to the SPNC through the NG-OP-SP interface, where the configuration request includes information indicating that the SP's self-owned network function stops serving the network slice instance, an association between the SP's self-owned network function and the network slice instance is deleted, and so on.

In this embodiment of the present invention, by using step 701 to step 705, when the SP provides a self-owned network function and/or a customized network function, the NSM&O creates, for the SP, a network slice instance that includes the SP's self-owned network function and/or the customized network function. By using step 706 and step 707, when the SP provides the self-owned network function and/or the customized network function, the NSM&O obtains complete performance and fault information of the network slice instance, and the SP obtains management data of the network slice instance from the NSM&O. By using step 708 to step 710, when the SP provides the self-owned network function and/or the customized network function, the NSM&O adjusts the network slice instance for the SP. By using step 711 to step 713, when the SP provides the self-owned network function and/or the customized network function, the NSM&O terminates the network slice instance for the SP.

Figure 8:
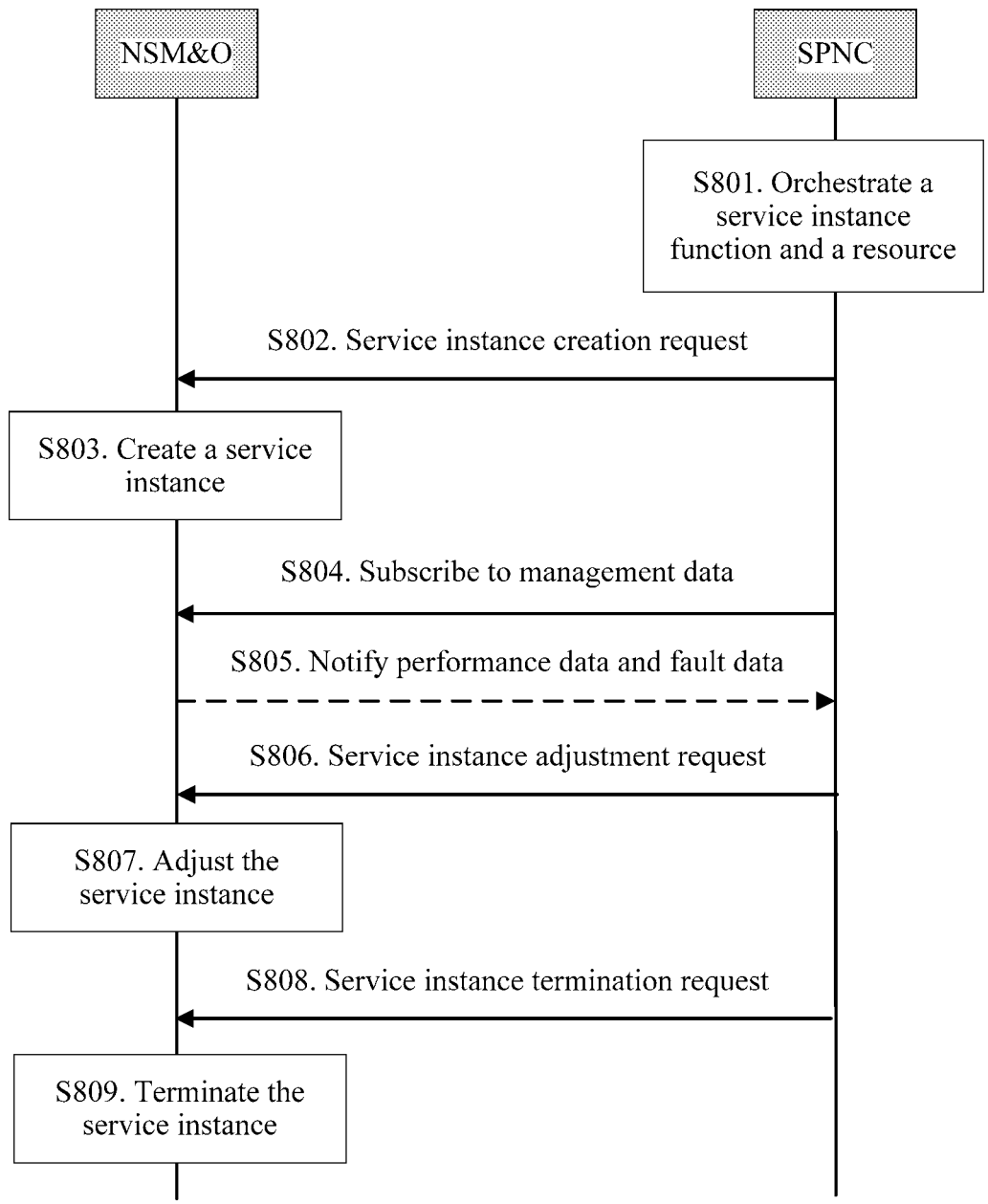
FIG. 8 is a flowchart of another service providing method according to an embodiment of the present invention.

After the SP obtains the network slice instance from the operator to provide a service for the SP, the SP may require a same network slice instance to provide different services for the SP's customers. For such a scenario (for example, the scenario 2 described above), an embodiment of the present invention provides a method for providing different services by using a same network slice instance, as shown in FIG. 8. The method includes the following steps:

801. An SP orchestrates a service instance function and a resource. After the SP obtains, from an NSM&O, information (including a network slice instance identifier, and/or a network function, a sub-network slice instance, a network resource, and a configuration) about a network slice instance that is created/allocated by an operator for the SP, an SPNC orchestrates network functions and network resources required by different service instances that the SPNC wants to provide, including network functions and/or sub-network slice instances required by the different service instances, whether logical isolation is required, a network resource usage policy, and the like.

802. The SP sends a service instance creation request to the operator. Based on a result of the orchestration, the SPNC sends the service instance creation request to the NSM&O through an NG-OP-SP interface. The service instance creation request carries information such as a network function and a resource that are required by each service instance.

803. The NSM&O creates a plurality of service instances on a same network slice instance based on a requirement of the SP. Specifically, the NSM&O generates a logical topology based on the network function and the resource that are used by each service instance requested by the SP, and configures a network function and/or a sub-network slice instance by using an EMS, including isolation between service instances, a resource usage policy of the service instance, and the like. When the network function and/or the sub-network slice instance provide/provides a service for the plurality of service instances, the NSM&O allocates an identity for internal identification by an operator to each service instance, and configures the EMS to perceive each service instance. The EMS collects management data of the network function and/or the sub-network slice instance, such as performance data and fault data, associates the service instances and the management data, and reports the management data to the NSM&O. Therefore, the NSM&O may distinguish management data of different service instances.

804. The SP may subscribe, through the NG-OP-SP interface, to the network slice instance and the management data of each service instance from the NSM&O, including the performance data and/or the fault data, and the like. Subscription messages may include information such as a data parameter, a reporting time, and frequency that need to be obtained. In this embodiment of the present invention, different subscription configurations may be used for various service instances.

805. The NSM&O collects and analyzes the management data of the network slice instance and each service instance, and notifies the SP of the management data of each service instance based on a subscription requirement of the SP.

806. The SP sends a service instance adjustment request to the operator. When the SP's requirement for the service instance changes, the SPNC sends the service instance adjustment request to the NSM&O through the NG-OP-SP interface. The request message carries an identifier of the service instance, and may further include a network function, a sub-network slice instance, a resource extension or contraction requirement, and the like that are used for the service instance. It should be noted that the service instance adjustment request of the SP does not relate to operations such as extension and contraction of the network function, the sub-network slice instance, and the resource that are of the network slice instance, but is merely allocation and adjustment of a function and a resource that are allocated to each service instance.

807. The operator adjusts the service instance based on the received service instance adjustment request. The NSM&O configures the related network function, or the sub-network slice instance and the resource, and adjusts a resource usage policy, a logical topology, and the like of the service instance by using the EMS based on the SP's request.

808. When the SP no longer needs a service instance, the SP sends a service instance termination request to the NSM&O, where the service instance termination request carries an identity of the service instance that needs to be terminated.

809. The NSM&O executes the service instance termination request, including configuring a service policy for a network function and a resource by using the EMS, deleting an association from the service instance, and the like.

In this embodiment of the present invention, when the operator provides the network slice instance for the SP, the SP orchestrates a plurality of service instances on the network slice instance, and provides a differentiated service for a user of the SP. In addition, the SP can control a life cycle of the service instance, and obtain independent management data such as performance and a fault of each service instance from the NSM&O.

Figure 9:
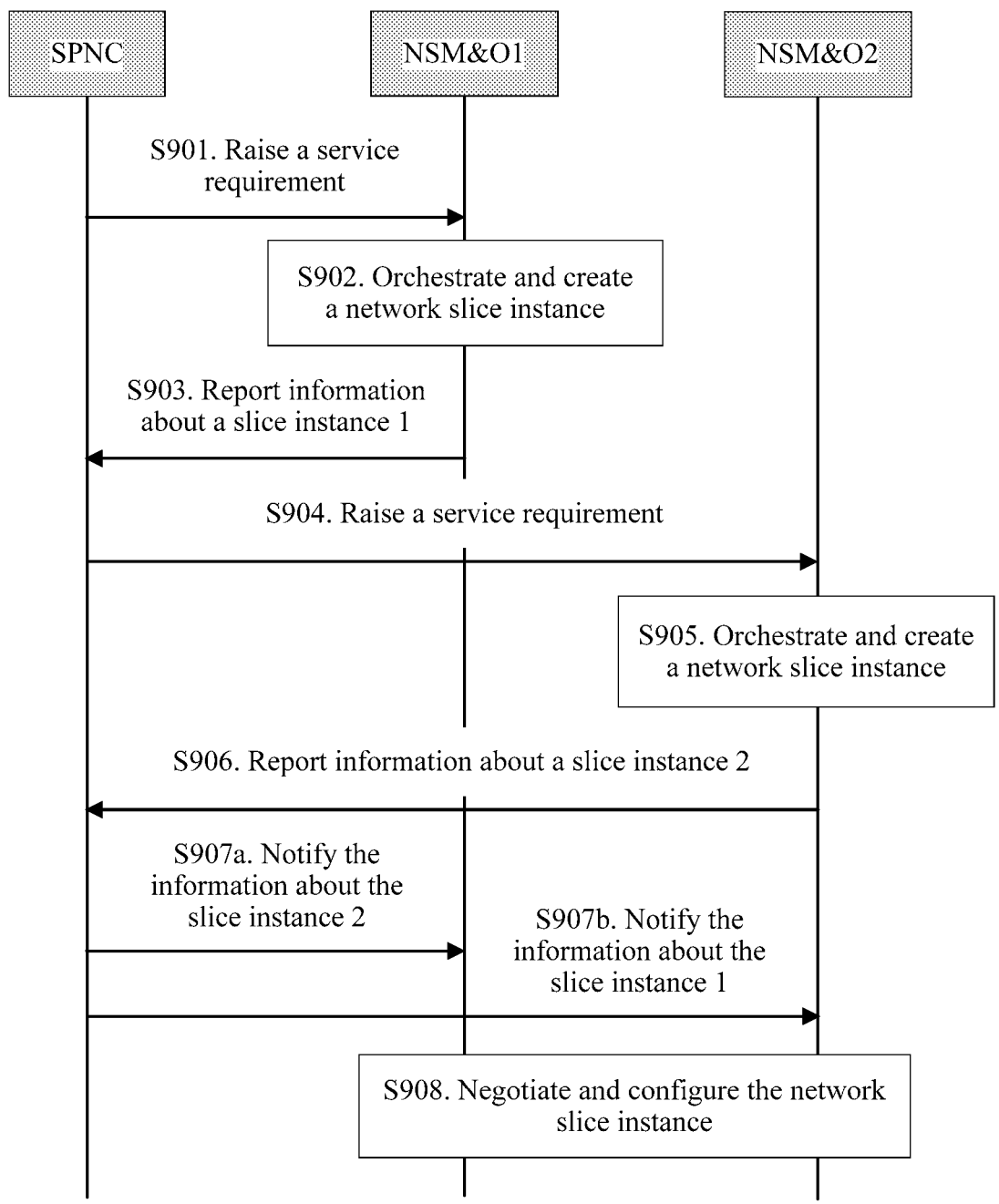
FIG. 9 is a flowchart of still another service providing method according to an embodiment of the present invention.

The SP may request services from a plurality of operators because of coverage areas, different charging policies of operators, and other commercial considerations. The plurality of operators each creates a network slice instance to provide a service for the SP. In this case, the plurality of network slice instances (for example, from different administrative domains) may provide similar services for the SP in a same geographic area or different geographic areas. For example, the SP requests from the plurality of operators that an expressway vehicle communication service covers different road segments. When the SP wants a user of the SP to be able to access all network slice instances to obtain a service, a service level combination of the plurality of network slice instances needs to be supported, and the service for the user can be migrated (migration) between the network slice instances. In such a scenario, the SP needs to notify the plurality of operators of information about a network slice instance created by another operator. A network slice management system (for example, an NSM&O) of an operator configures a plurality of network slice instances to support handover of a user of the SP from one network slice instance to another network slice instance. For example, network slice management systems of the plurality of operators may configure network slice selection assistance information (NSSAI) of other administrative domains for some network functions of the network slice instance, so as to implement roaming of the user between different network slice instances. Based on such a scenario (for example, the scenario 3 described above), an embodiment of the present invention provides a method for providing a service by using a network slice, as shown in FIG. 9. The method includes the following steps:

901. An SP raises a service requirement to an operator 1 to request a network service.

The SP requests the network service from the operator 1 based on network deployment, charging, and/or management of the operator 1. Management may refer to network management information and a network management capability of an operator. The network management information means that the SP may subscribe to network management data required by the SP, including performance data, fault data, and the like. The network management capability refers to whether a created network slice instance can be extended, contracted, updated, and so on.

In this step, the SPNC may send a service request message to an NSM&O to request the operator 1 to provide the network service. The service request message may carry parameters such as a service type and a service requirement that need to be provided. The service requirement includes, for example, one or more of a coverage range, an access quantity, a latency, reliability, and an access rate. The service request message may further carry a required network function.

The operator negotiates service information such as an SLA and/or a tariff with the SP based on a network resource and a capability.

902. The operator 1 orchestrates and creates a network slice instance 1 based on the service requirement of the SP to provide a service for the SP.

903. The NSM&O 1 sends a notification message to the SPNC through an NG-OP-SP interface, to notify the SPNC that the network slice instance 1 is created. The notification message carries an identity of the network slice instance 1. Further, the notification message may further include at least one of a network function and a network resource.

904, 905, and 906: The SP requests a service from an operator 2. These steps are similar to step 901, step 902, and step 903 respectively. The SP requests the network service from the operator 2 based on network deployment, charging, and management of the operator 2. Content of the request includes a service type (the same as that of the operator 1), a service requirement parameter (which may be different from that of the operator 1), and the like that need to be provided. The content of the request may further include a required network function (the same as that required by the operator 1).

907a. The SP notifies the operator 1 (for example, an NSM&O 1) of information about a network slice instance 2. The information may include one or more of the following information: an operator to which the network slice instance 2 belongs, an identity of the network slice instance 2, a service type and a service range of the network slice instance 2, and the like.

907b. The SP notifies the operator 2 (for example, an NSM&O 2) of information about the network slice instance 1. The information may include one or more of the following information: an operator to which the network slice instance 1 belongs, an identity of the network slice instance 1, a service type and a service range of the network slice instance 1, and the like.

908. The operator 1 and the operator 2 negotiate and configure a network slice instance.

In this step, the NSM&O 1 and the NSM&O 2 configure network functions in respective network slice instances, including a certification and authentication function, a slice instance selection function, a charging function, and the like. For example, the NSM&O configures the certification and authentication function/a home subscriber server (HSS) to enable the NSM&O to identify a user of the SP. When the user of the SP roams from one coverage range of the network slice instance 1 to another coverage range of the network slice instance 2, the network slice instance 2 serves as an access network slice instance. In this case, the NSM&O 1 and the NSM&O 2 need to negotiate and configure a slice selection function and an authentication function that are of the respective slice instances, so that the NSM&O 1 and the NSM&O 2 can identify slice selection assistance information of the network slice instances of the other party.

For example, a bus company separately purchases an Internet of Vehicles slice from various operators to monitor a driving status of a vehicle that belongs to the bus company, and whether a driver wearily drives, and provide an Internet access service for a user in the vehicle, and so on. A network slice instance is switched when a vehicle moves from one country to another. When the user is handed over from the network slice instance 1 to the network slice instance 2, the user still provides an ID of the network slice instance 1 for initial access. In this case, the network slice instance 2 needs to identify the ID of the network slice instance 1, learns that the user requires the network slice instance 2, and at the same time, updates a slice ID of the user to the network slice instance 2.

In this embodiment of the present invention, when a plurality of operators provide a plurality of network slice instances for the SP, the SP participates in coordinating all the network slice instances so that all the network slice instances provide a same service for the SP. The user of the SP may obtain a same/similar network service from any one of these network slice instances.

In some other scenarios (for example, the scenario 4 described above), the SP requests different portions of a network slice instance from the plurality of operators because of charging policies of the plurality of operators and other commercial considerations. In this case, a complete network slice instance that meets a service requirement of a customer includes different parts, and the different parts are respectively provided by the plurality of operators. For example, the complete network slice instance includes an RAN part and a core network (CN) part, and the SP may request the RAN part from the operator 1 and the CN part from the operator 2.

Specifically, the SP may decompose a complete service request into a plurality of sub-service requests, and request corresponding services from the plurality of operators respectively. A network slice management system (which may be, for example, an NSM&O) of each operator checks validity of a network resource and a capability, and negotiates an SLA with the SP. If a service requested by the SP can be provided, the network slice management system of each operator creates a sub-network slice instance, and sends information about the sub-network slice instance to the SP. The SP integrates sub-network slice instances into a complete network slice instance based on the received information about the sub-network slice instances. After all sub-network slice instances are created, the SP sends the following information to the operator: 1. sub-network slice instances of other operators; and 2. information used to associate other sub-network slice instances. The network slice management system of each operator configures the sub-network slice instance to constitute the complete network slice instance. The network slice management system of each operator can monitor a status of the sub-network slice instance, and send management data subscribed to by the SP to the SP, so that the SP can learn a status of the complete network slice.

Figure 10A:
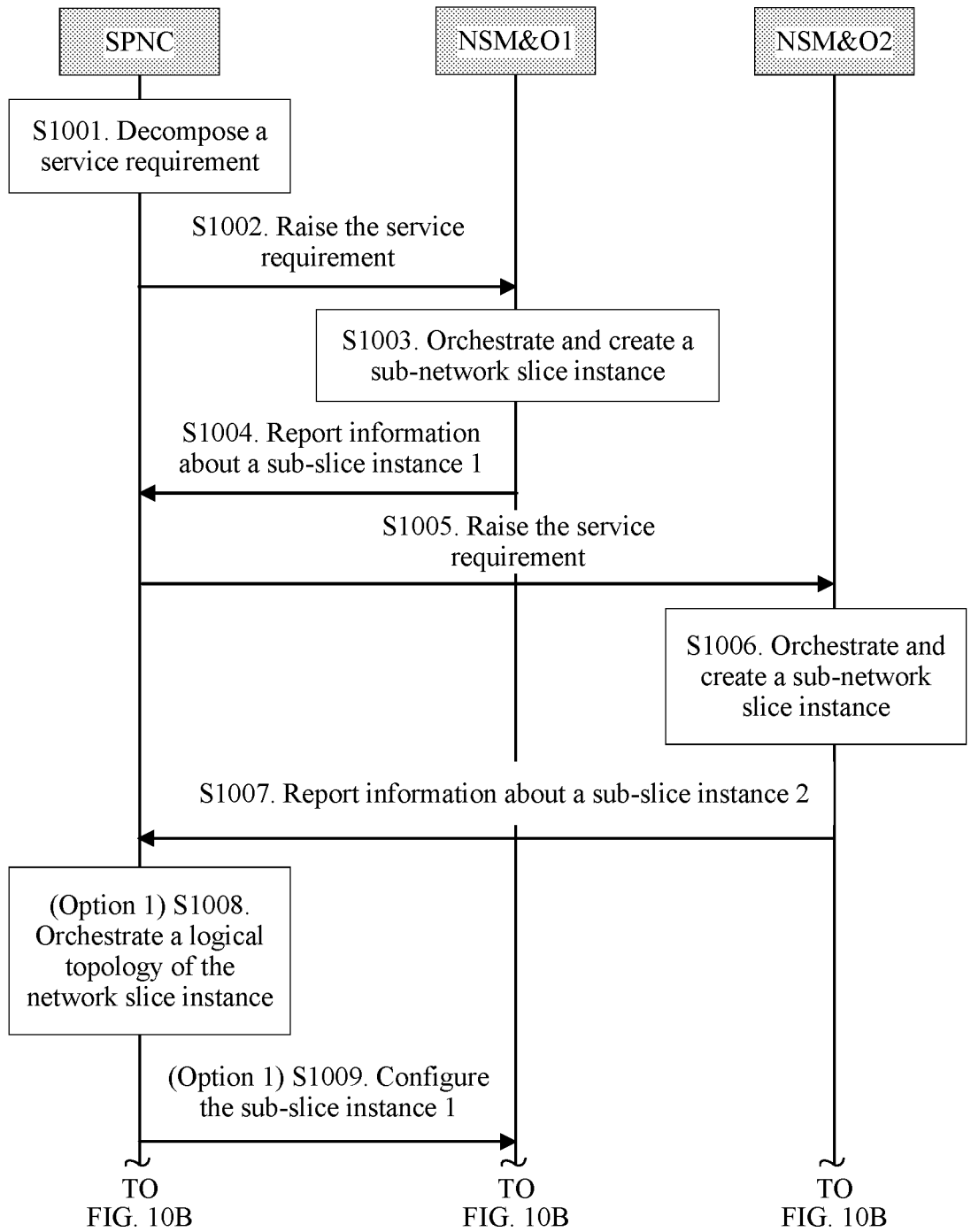
FIG. 10A and FIG. 10B are a flowchart of yet another service providing method according to an embodiment of the present invention.
Figure 10B:
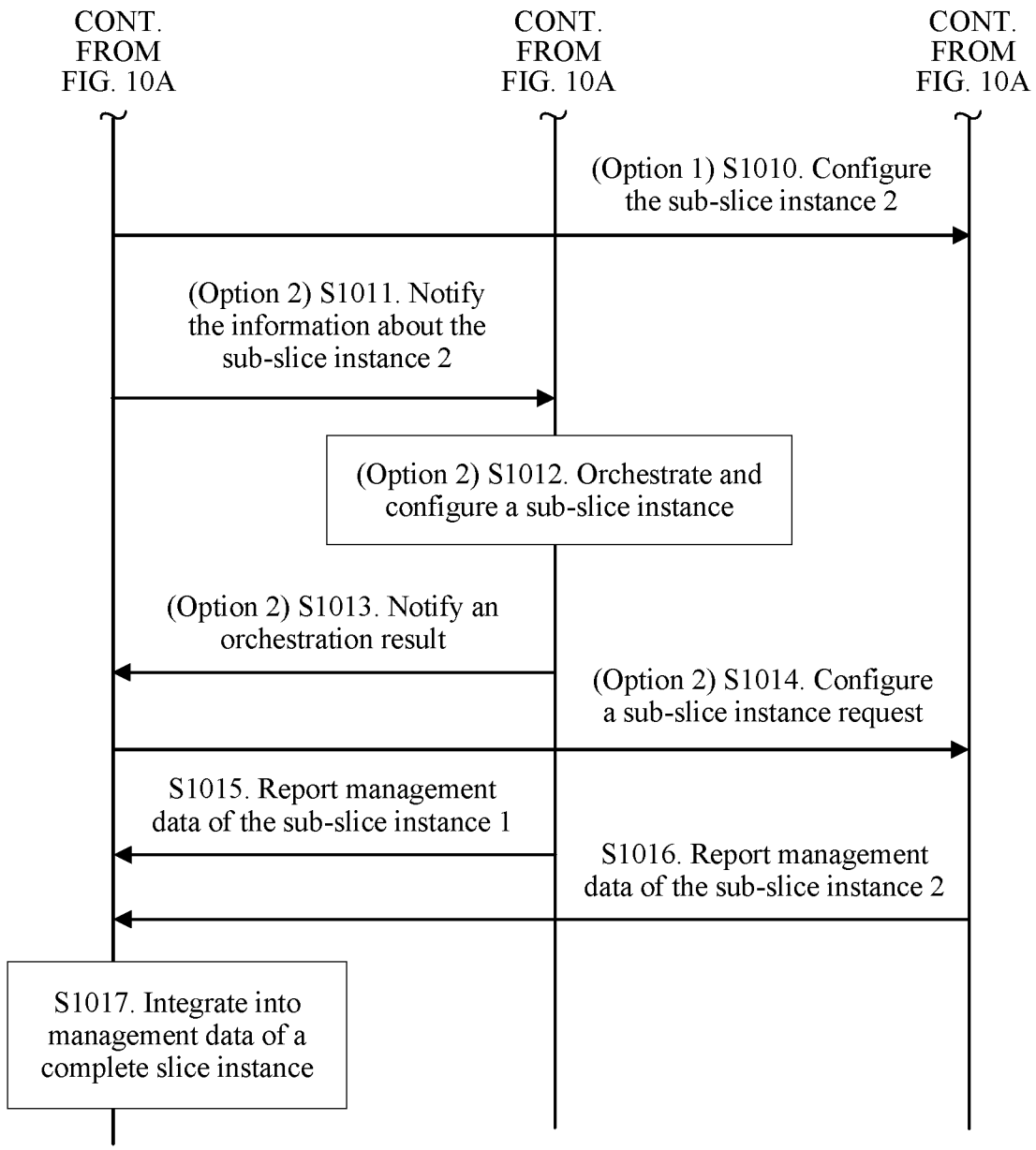

For this scenario, an embodiment of the present invention provides a method for providing a service to an SP by using a network slice instance, as shown in FIG. 10A and FIG. 10B. An NSM&O 1, an NSM&O 2, a corresponding operator 1, and a corresponding operator 2 in the following flowchart are used only as an example, and quantities of operators and NSM&Os are not limited in this embodiment of the present invention. The method includes the following steps:

1001. An SPNC decomposes a complete network service requirement into requirements for sub-networks based on network deployment, charging, and management of operators. For example, the SP decomposes the complete network service requirement into a requirement for an access network and a requirement for a core network.

1002. The SPNC sends a service request message for the sub-network to the NSM&O 1 of the operator 1 through the NG-OP-SP interface based on the decomposed requirement. The service request message may carry parameters such as a service type and a service requirement that need to be provided. The service requirement includes, for example, one or more of a coverage range, an access quantity, a latency, reliability, and an access rate. The service request message may further carry a required network function. The operator 1 negotiates service information such as an SLA and/or a tariff with the SP based on a network resource and a capability.

1003. The NSM&O 1 orchestrates and creates a sub-network slice instance 1 based on the service requirement of the SPNC.

1004. The NSM&O 1 notifies the SPNC that the sub-network slice instance 1 is created. The NSM&O 1 sends a notification message to the SPNC through the NG-OP-SP interface, to notify the SPNC that the network slice instance 1 is created. The notification message carries an identity of the network slice instance 1. Further, the notification message may further include at least one of a network function and a network resource.

1005, 1006, and 1007: The SP requests the operator 2 to create a sub-network slice instance 2. These steps are corresponding to step 1002, step 1003, and step 1004 respectively. Details are not described herein again.

There are two possible methods for connecting and integrating the sub-network slice instance 1 and the sub-network slice instance 2 into a complete network slice instance.

Option 1: The SP has a capability to orchestrate the sub-network slice instances to constitute a network slice instance. The following step 1008 to step 1010 are applied to the option 1.

1008. After obtaining information about the sub-network slice instance 1 and the sub-network slice instance 2, the SPNC needs to orchestrate a logical topology of a network slice, a communication link and/or an interface between the sub-network slice instances, and the like. For example, if the sub-network slice instance 1 is an access network instance, and the sub-network slice instance 2 is a core network instance, the SP needs to orchestrate a link, an interface, and/or a protocol (including selecting an appropriate mobility management function, an appropriate serving gateway, and the like for each access node, and selecting a communication link, an interface, and a protocol between access nodes, and so on) between an access node (for example, an eNodeB or a gNodeB) in the access network instance and a core network control plane network function (for example, an MME or an SGSN) and a core network data plane network function (a service-GW or a GGSN). If there is an SP's self-owned network function, a location of the SP's self-owned network function, a related communication link, a related interface, and the like are orchestrated.

1009. Based on an orchestration result, the SPNC sends a configuration notification for the sub-network slice instance 1 to the NSM&O 1 through the NG-OP-SP interface. For example, a network function in the sub-network slice instance 1 is configured to know an IP address and performance (such as a forwarding capability and a processing capability) of a network function in the sub-network slice instance 2, and a communication link is established. The NSM&O 1 configures the sub-network slice instance 1 by using an EMS.

1010. Based on the orchestration result, the SPNC sends a configuration notification for the sub-network slice instance 2 to the NSM&O 2 through the NG-OP-SP interface. For example, a network function in the sub-network slice instance 2 is configured to know an IP address and performance (such as a forwarding capability and a processing capability) of a network function in the sub-network slice instance 1, and the communication link is established. The NSM&O 2 configures the sub-network slice instance 2 by using the EMS.

Option 2: The SPNC has no capability to orchestrate the network slice instance, and requests an NSM&O of one operator to orchestrate the network slice instance. The following step 1011 to step 1014 are applied to the option 2.

1011. The SPNC notifies the NSM&O 1 of information about the sub-network slice instance 2, including an identity of the sub-network slice instance 2, a network function and/or a network resource of the sub-network slice instance 2, and the like. The SPNC sends a network slice instance orchestration request.

1012. After obtaining the information about the sub-network slice instance 2, the NSM&O 1 orchestrates the network slice instance, including a logical topology of the network slice instance, a communication link and an interface between the sub-network slice instances, and the like. In addition, the NSM&O 1 configures the sub-network slice instance 1 based on an orchestration result. For example, if the sub-network slice instance 1 is an access network instance, and the sub-network slice instance 2 is a core network instance, the NSM&O 1 needs to orchestrate a link, an interface, and/or a protocol (including selecting an appropriate mobility management function, an appropriate serving gateway, and the like for each access node, and selecting a communication link, an interface, and a protocol between access nodes, and so on) between an access node (for example, an eNodeB or a gNodeB) in the access network instance and a core network control plane network function (for example, an MME or an SGSN) and a core network data plane network function (a service-GW or a GGSN).

1013. The NSM&O 1 notifies the SPNC of the orchestration result.

1014. The SPNC sends a configuration notification for the sub-network slice instance 2 to the NSM&O 2 through the NG-OP-SP interface. For example, a network function in the sub-network slice instance 2 is configured to know an IP address and performance (such as a forwarding capability and a processing capability) of a network function in the sub-network slice instance 1, and a communication link is established. The NSM&O 2 configures the sub-network slice instance 2 by using an EM and/or a DM.

After the sub-network slice instance 1 and the sub-network slice instance 2 constitute the complete network slice instance, a service may be provided.

1015. The NSM&O 1 measures and reports management data of the sub-network slice instance 1, including performance data and fault information based on the subscription of the SPNC to the management data.

1016. The NSM&O 2 measures and reports management data of the sub-network slice instance 2, including performance data and fault information based on the subscription of the SPNC to the management data.

1017. The SPNC analyzes performance data of each sub-network slice instance, and integrates the performance data into performance data of the complete network slice instance. The SPNC analyzes fault information of each sub-network slice instance, determines impact of a fault of each sub-network slice instance on the entire network slice instance, determines whether each fault is a root fault or an associated fault, and notifies or instructs the NSM&O to rectify the fault.

In this embodiment of the present invention, when the plurality of operators separately provide some network slice instances for the SP, namely, sub-network slice instances, the SP integrates and configures all sub-network slice instances to constitute the complete network slice instance to provide a service for a user of the SP. In addition, the SP obtains the performance data of each sub-network slice instance, and integrates the performance data to obtain management data of the entire network slice instance. The SP obtains the fault information of each sub-network slice instance, determines impact of a fault of each sub-network slice instance on an entire network slice instance service, and notifies or instructs the NSM&O to rectify the fault.

The foregoing describes in detail a network management architecture and a method according to the embodiments of the present invention with reference to FIG. 1 to FIG. 10A and FIG. 10B. The following describes in detail network devices according to the embodiments of the present invention with reference to FIG. 11 to FIG. 14.

Figure 11:
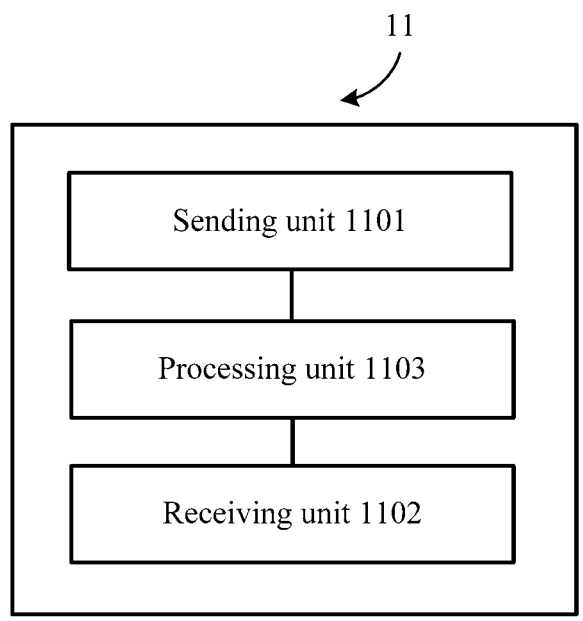
FIG. 11 to FIG. 14 are schematic structural diagrams of network devices according to embodiments of the present invention.

FIG. 11 is a schematic block diagram of a network device 11 according to an embodiment of the present invention. It should be understood that, the network device 11 can perform the steps performed by the SPNC in the methods in FIG. 6 to FIG. 10A and FIG. 10B. To avoid repetition, details are not described herein again. The network device 11 includes:

a sending unit 1101, configured to perform sending steps of the SPNC in FIG. 6 to FIG. 10A and FIG. 10B, for example, sending a service request message, sending a subscription request, and sending network slice instance information;

a receiving unit 1102, configured to perform receiving steps of the SPNC in FIG. 6 to FIG. 10A and FIG. 10B, for example, receiving a notification message and receiving subscribed management data; and a processing unit 1103, configured to perform other steps except the sending steps and the receiving steps of the SPNC in FIG. 6 to FIG. 10A and FIG. 10B, for example, negotiating service information with an NSM&O, configuring a self-owned network function, and decomposing a requirement.

It should be understood that, an action executed by the processing unit 1103 may be implemented by a processor, and actions executed by the sending unit 1101 and the receiving unit 1102 may be implemented by a transceiver under control of the processor.

Figure 12:
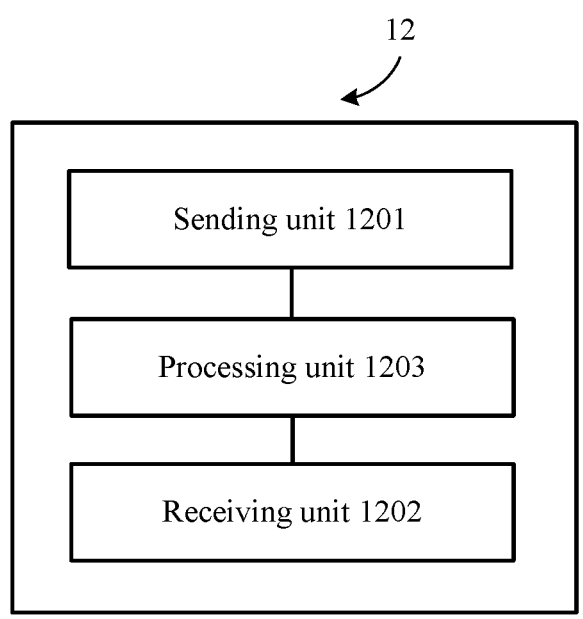

FIG. 12 is a schematic block diagram of a network device 12 according to an embodiment of the present invention. It should be understood that, the network device 12 can perform the steps performed by the NSM&O in the methods in FIG. 6 to FIG. 10A and FIG. 10B. To avoid repetition, details are not described herein again. The network device 12 includes:

a sending unit 1201, configured to perform sending steps of the NSM&O in FIG. 6 to FIG. 10A and FIG. 10B, for example, sending a notification message and sending a subscribed management data request;

a receiving unit 1202, configured to perform receiving steps of the NSM&O in FIG. 6 to FIG. 10A and FIG. 10B, for example, receiving a service request message, receiving a subscription request, and receiving network slice instance information; and a processing unit 1203, configured to perform other steps except the sending steps and the receiving steps of the NSM&O in FIG. 6 to FIG. 10A and FIG. 10B, for example, negotiating service information with an SPNC, creating a network slice instance, and terminating the network slice instance.

It should be understood that, an action executed by the processing unit 1203 may be implemented by a processor, and actions executed by the sending unit 1201 and the receiving unit 1202 may be implemented by a transceiver under control of the processor.

Figure 13:
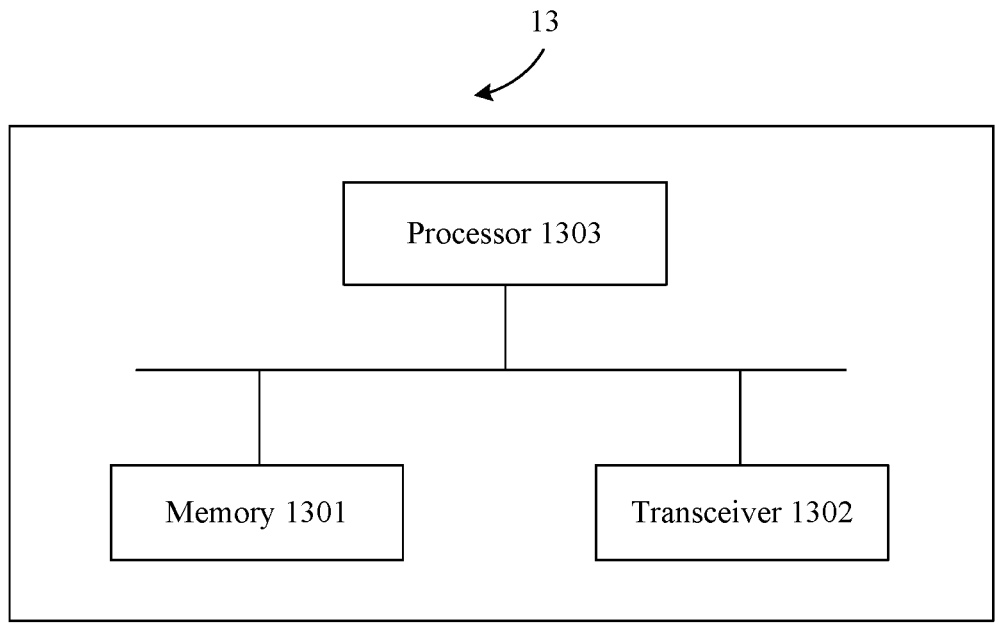

FIG. 13 is a schematic structural block diagram of an apparatus according to an embodiment of the present invention. The apparatus 13 can perform the steps performed by the SPNC in the methods in FIG. 6 to FIG. 10A and FIG. 10B. The apparatus 13 includes:

a memory 1301, configured to store a program;

a transceiver 1302, configured to communicate with another device such as an NSM&O; and a processor 1303, separately connected to the memory 1301 and the transceiver 1302, and configured to execute the program in the memory 1301. When the program in the memory 1301 is executed, the apparatus 13 performs the actions executed by the SPNC in FIG. 6 to FIG. 10A and FIG. 10B.

Figure 14:
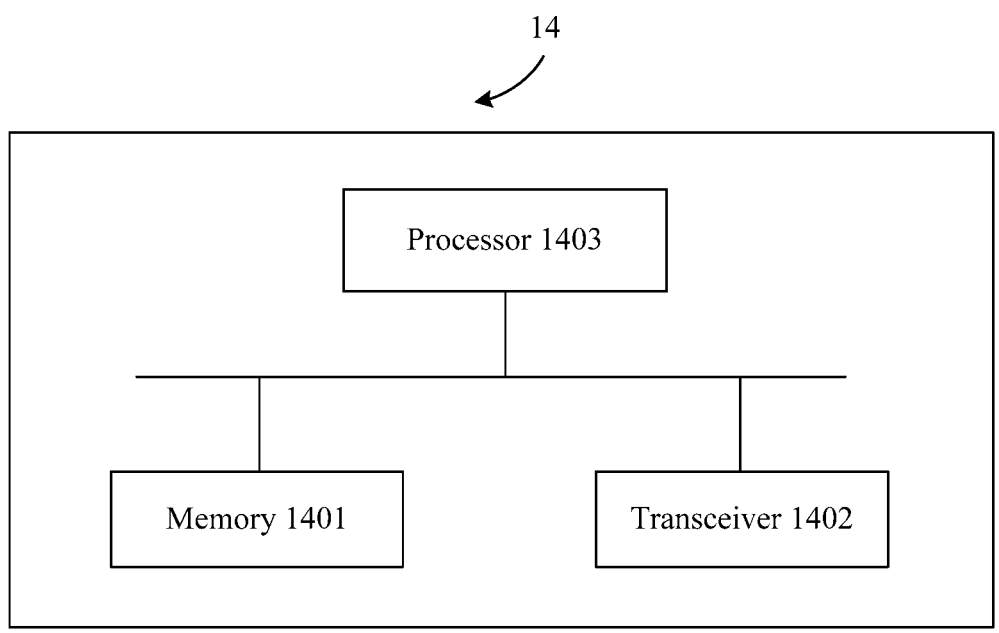

FIG. 14 is a schematic structural block diagram of an apparatus according to an embodiment of the present invention. The apparatus 14 can perform the steps performed by the NSM&O in the methods in FIG. 6 to FIG. 10A and FIG. 10B. The apparatus 14 includes:

a memory 1401, configured to store a program;

a transceiver 1402, configured to communicate with another device such as an SPNC; and a processor 1403, separately connected to the memory 1401 and the transceiver 1402, and configured to execute the program in the memory 1401. When the program in the memory 1401 is executed, the apparatus 14 performs the actions executed by the NSM&O in FIG. 6 to FIG. 10A and FIG. 10B.

It should be understood that in the embodiment of the present invention, the processor in the foregoing apparatus may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

In an implementation process, steps in the foregoing methods can be implemented by using a hardware integrated logic circuit in the processor, or by using instructions in a form of software. The steps of the method disclosed with reference to the embodiments of the present invention may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, a register, or the like. The storage medium is located in the memory, and a processor performs instructions in the memory and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division manner in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a Solid State Disk (SSD)), or the like.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service providing method, comprising:
receiving, by a network slice management system of an operator, a service request message sent by a control device of a third-party service provider, wherein the service request message requests the network slice management system to provide a service, and the service request message carries a service requirement;
negotiating, by the network slice management system with the control device, service information based on the service requirement, wherein the service information comprises a service level agreement (SLA) between the third-party service provider and the network slice management system;
creating, by the network slice management system, a network slice instance based on the service requirement, wherein the network slice instance is used to provide the service requested in the service request message;
sending, by the network slice management system, a notification message to the control device, wherein the notification message carries an identifier of the network slice instance;
receiving, by the network slice management system, a network slice instance adjustment request sent by the control device, wherein the network slice instance adjustment request carries the identifier of the network slice instance and requests an adjusted service requirement;
determining, by the network slice management system, whether the network slice instance adjustment request complies with the SLA;
in response to determining that the network slice instance adjustment request complies with the SLA, performing, by the network slice management system, one or more adjustment operations to the network slice instance based on the network slice instance adjustment request;
receiving, by the network slice management system, a second network slice instance adjustment request sent by the control device, wherein the second network slice instance adjustment request carries the identifier of the network slice instance and requests a second adjusted service requirement;
determining, by the network slice management system, whether the second network slice instance adjustment request complies with the SLA; and
in response to determining that the network slice instance adjustment request does not comply with the SLA, renegotiating, by the network slice management system with the control device, a second SLA between the third-party service provider and the network slice management system based on the second adjusted service requirement.

2. The method according to claim 1, wherein the negotiating, by the network slice management system, service information with the control device based on the service requirement comprises:
checking, by the network slice management system, whether a network resource and a capability of the operator support the service requirement; and
in response to determining that the network resource and the capability support the service requirement, negotiating, by the network slice management system, the service information with the control device.

3. The method according to claim 1, wherein the network slice management system receives a service instance creation request sent by the control device, and the network slice management system creates a plurality of service instances on the network slice instance.

4. The method according to claim 3, wherein the network slice management system creates isolation between the plurality of service instances on the network slice instance and allocates an identifier to each of the plurality of service instances.

5. The method according to claim 4, wherein the network slice management system receives a service instance adjustment request from the control device, wherein the service instance adjustment request requests an adjusted service instance requirement of one of the plurality of service instances on the network slice instance and carries an identifier of the one of the plurality of service instances, wherein the adjusted service instance requirement is related to allocation or adjustment of a function or a resource that is allocated to the one of the plurality of service instances on the network slice instance.

6. The method according to claim 1, wherein the network slice management system receives information about another network slice instance sent by the control device, and the another network slice instance is created by another operator.

7. The method according to claim 6, wherein the network slice management system configures the network slice instance and the another network slice instance to support handover of a user of the third-party service provider from the network slice instance to the another network slice instance.

8. The method according to claim 1, wherein the one or more adjustment operations to the network slice instance is related to a self-owned network function of the third-party service provider, the method further comprises:

sending, by the network slice management system, a request for configuring the self-owned network function of the self-owned network function to the control device.

9. A service providing method, comprising:
sending, by a control device of a third-party service provider, a service request message to a network slice management system of an operator, wherein the service request message requests the network slice management system to provide a service, and the service request message carries a service requirement;
negotiating, by the control device with the network slice management system, service information based on the service requirement, wherein the service information comprises a service level agreement (SLA) between the third-party service provider and the network slice management system;
receiving, by the control device, a notification message sent by the network slice management system, wherein the notification message carries an identifier of a network slice instance;
sending, by the control device to the network slice management system, a network slice instance adjustment request, wherein the network slice instance adjustment request carries the identifier of the network slice instance and requests an adjusted service requirement;
sending, by the control device to the network slice management system, a second network slice instance adjustment request sent, wherein the second network slice instance adjustment request carries the identifier of the network slice instance and requests a second adjusted service requirement; and
renegotiating, by the control device with the network slice management system, in a second SLA between the third-party service provider and the network slice management system based on the second adjusted service requirement.

10. The method according to claim 9, wherein the control device sends a service instance creation request to the network slice management system, wherein the service instance creation request requests the network slice management system to create a plurality of service instances on the network slice instance.

11. The method according to claim 9, wherein the control device sends information about another network slice instance to the network slice management system, and the another network slice instance is created by another operator.

12. The method according to claim 11, wherein the network slice instance and the another network slice instance support handover of a user of the third-party service provider from the network slice instance to the another network slice instance.

13. A network device, comprising:
at least one processor coupled to one or more memories that store instructions for execution by the at least one processor such that, when executed, cause the network device to:
receive a service request message sent by a control device of a third-party service provider, wherein the service request message requests the network device to provide a service, and the service request message carries a service requirement;
negotiate, with the control device, service information based on the service requirement, wherein the service information comprises a service level agreement (SLA) between the third-party service provider and the network device;
create a network slice instance based on the service requirement, wherein the network slice instance is used to provide the service requested in the service request message;
send a notification message to the control device, wherein the notification message carries an identifier of the network slice instance;
receive a network slice instance adjustment request sent by the control device, wherein the network slice instance adjustment request carries the identifier of the network slice instance and requests an adjusted service requirement;
determine whether the network slice instance adjustment request complies with the SLA;
in response to determining that the network slice instance adjustment request complies with the SLA, perform one or more adjustment operations to the network slice instance based on the network slice instance adjustment request;
receive a second network slice instance adjustment request sent by the control device, wherein the second network slice instance adjustment request carries the identifier of the network slice instance and requests a second adjusted service requirement;
determine whether the second network slice instance adjustment request complies with the SLA; and
in response to determining that the network slice instance adjustment request does not comply with the SLA, renegotiate with the control device a second SLA between the third-party service provider and the network device based on the second adjusted service requirement.

14. The network device according to claim 13, wherein the network device is caused to receive information about another network slice instance sent by the control device, wherein the another network slice instance is created by another operator.

15. The network device according to claim 14, wherein the network device is caused to configure the network slice instance and the another network slice instance to support handover of a user of the third-party service provider from the network slice instance to the another network slice instance.

16. A network device of a third-party service provider, comprising:
at least one processor coupled to one or more memories that store instructions for execution by the at least one processor such that, when executed, cause the network device to:
send a service request message to a network slice management system of an operator, wherein the service request message requests the network slice management system to provide a service, and the service request message carries a service requirement;
negotiate, with the network slice management system, service information based on the service requirement, wherein the service information comprises a service level agreement (SLA) between the third-party service provider and the network slice management system;
receive a notification message sent by the network slice management system, wherein the notification message carries an identifier of a network slice instance;
send, to the network slice management system, a network slice instance adjustment request, wherein the network slice instance adjustment request carries the identifier of the network slice instance and requests an adjusted service requirement;

send, to the network slice management system, a second network slice instance adjustment request, wherein the second network slice instance adjustment request carries the identifier of the network slice instance and requests a second adjusted service requirement; and renegotiate, with the network slice management system, a second SLA between the third-party service provider and the network slice management system based on the second adjusted service requirement.

17. The network device according to claim 16, wherein the network device is caused to send a service instance creation request to the network slice management system, wherein the service instance creation request requests the network slice management system to create a plurality of service instances on the network slice instance.

18. The network device according to claim 16, wherein the network device is caused to send information about another network slice instance to the network slice management system, wherein the another network slice instance is created by another operator.

19. The network device according to claim 18, wherein the network slice instance and the another network slice instance support handover of a user of the third-party service provider from the network slice instance to the another network slice instance.

* * * * *